(12) United States Patent
Lee et al.

(10) Patent No.: US 12,733,593 B2
(45) Date of Patent: Sep. 15, 2026

(54) PLANT CULTIVATOR

(71) Applicant: LG ELECTRONICS INC., Seoul (KR)

(72) Inventors: Soobeom Lee, Seoul (KR); Hakju Lee, Seoul (KR); Seok Man Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/688,255

(22) PCT Filed: Aug. 30, 2022

(86) PCT No.: PCT/KR2022/012940
§ 371 (c)(1),
(2) Date: Feb. 29, 2024

(87) PCT Pub. No.: WO2023/033508
PCT Pub. Date: Mar. 9, 2023

(65) Prior Publication Data
US 2025/0008879 A1 Jan. 9, 2025

(30) Foreign Application Priority Data
Aug. 30, 2021 (KR) ........................ 10-2021-0115141

(51) Int. Cl.
*A01G 7/04* (2006.01)
*A01G 27/00* (2006.01)
(Continued)

(52) U.S. Cl.
CPC ............. *A01G 7/045* (2013.01); *A01G 31/02* (2013.01); *A01G 27/005* (2013.01); *A01G 27/04* (2013.01)

(58) Field of Classification Search
CPC ...... A01G 7/045; A01G 31/02; A01G 27/005; A01G 27/04; F21V 17/005; F21V 23/002
See application file for complete search history.

(56) References Cited

U.S. PATENT DOCUMENTS 9,243,789 B1 * 1/2016 Chow .................... A01G 9/249
10,881,052 B1 * 1/2021 Tsao ....................... A01G 7/045
(Continued)

FOREIGN PATENT DOCUMENTS

CN 105900820 8/2016
CN 205848244 1/2017
(Continued)

OTHER PUBLICATIONS

CN_211832085_U (Year: 2020).*
(Continued)

*Primary Examiner* — Joshua D Huson
*Assistant Examiner* — Edgar Reyes
(74) *Attorney, Agent, or Firm* — KED & ASSOCIATES, LLP

(57) ABSTRACT

The present disclosure relates to a plant cultivator that is capable of improving efficiency of a light source part by being configured to be capable of adjusting the vertical position of a handle and a light source port using a pair of spacers so that the height of the light source part is capable of being adjusted according to the plant growth stage, and is capable of reducing manufacturing costs by supplying power to the light source part using one of a pair of spacers.

15 Claims, 14 Drawing Sheets

(51) Int. Cl.
*A01G 27/04* (2006.01)
*A01G 31/02* (2006.01)

(56) References Cited

U.S. PATENT DOCUMENTS

| | | | | |
|---|---|---|---|---|
| 11,166,417 | B2 * | 11/2021 | Montagano | A01G 9/20 |
| 2014/0069007 | A1 * | 3/2014 | Chen | A01G 9/249 47/66.6 |
| 2016/0100528 | A1 * | 4/2016 | Chow | A01G 7/045 362/122 |
| 2016/0345513 | A1 * | 12/2016 | Lo | A01G 9/246 |
| 2018/0288950 | A1 * | 10/2018 | Ogata | A01G 7/045 |
| 2019/0289792 | A1 * | 9/2019 | Kim | A01G 7/045 |
| 2020/0060096 | A1 * | 2/2020 | Chen | A01G 9/249 |
| 2022/0369566 | A1 * | 11/2022 | Venkata | A01G 9/16 |
| 2023/0403992 | A1 * | 12/2023 | Khwaja | A01G 9/249 |

FOREIGN PATENT DOCUMENTS

| | | |
|---|---|---|
| CN | 107072159 | 8/2017 |
| EP | 3785526 | 3/2021 |
| JP | 2014-000023 | 1/2014 |
| KR | 10-2012-0060096 | 6/2012 |
| KR | 10-2014-0078183 | 6/2014 |
| KR | 10-2016-0065236 | 6/2016 |
| KR | 10-1735343 | 5/2017 |

OTHER PUBLICATIONS

KR_101435568_B1 (Year: 2014).*
KR_2012006009 (Year: 2012).*
KR_20120069070_A (Year: 2012).*
KR_20150014098_A (Year: 2015).*
KR_20190064058_A (Year: 2019).*
TW_201532511_A (Year: 2015).*
International Search Report (with English Translation) dated Dec. 2, 2022 issued in Application No. PCT/KR2022/012940.
Extended European Search Report dated Sep. 9, 2025 issued in Application No. 22865010.7.
Korean Notice of Allowance dated Apr. 8, 2026, issued in Application No. 10-2021-0115141.

* cited by examiner 40a
40
46
40c
412
40d
30
33
5131
513
40b
L
51
40e
515
5231
512
523
L
224
521
52
2214
522
1241
124
20
10e
2213
10c
23
1251
125
10d
10
10a
12
11

PLANT CULTIVATOR

CROSS-REFERENCE TO RELATED PATENT APPLICATIONS

This application is a U.S. National Stage Application under 35 U.S.C. § 371 of PCT Application No. PCT/KR2022/012940, filed Aug. 30, 2022, which claims priority to Korean Patent Application No. 10-2021-0115141, filed Aug. 30, 2021, whose entire disclosures are hereby incorporated by reference.

TECHNICAL FIELD

The present disclosure relates to a plant cultivator, and more specifically, to an open plant cultivator that is capable of improving efficiency of a light source part by being configured to be capable of adjusting the vertical position of a handle and a light source port using a pair of spacers so that the height of the light source part is capable of being adjusted according to the plant growth stage.

BACKGROUND ART

Recently, consumer interest in and demand for eco-friendly crops have been rapidly increasing.

In order to meet the interest and demand of such users, technologies and products related to home plant cultivators that can easily directly cultivate plants such as vegetables at home are being developed.

In general, the way to grow plants at home is to fill a container such as an open-top pot with culture soil, plant various seeds or plants in the culture soil, and supply moisture at regular intervals to provide the environment necessary for cultivating the plant (lighting, ventilation, and the like).

However, not only is it very cumbersome to create an environment for cultivating plants using the culture soil at home, but it is also not easy to obtain suitable culture soil.

As an alternative to the traditional cultivation method using such culture soil, the proportion of plant cultivators applying the hydroponic cultivation method using culture water mixed with water and culture medium in a certain ratio suitable for home use is gradually increasing.

In general, the home plant cultivators using the hydroponic cultivation method can be divided into a closed type, in which the cultivation environment in which plants are cultivated is formed as a closed room inside the cultivation room, and an open type, in which the cultivation environment is exposed to indoors as it is.

Regarding an open plant cultivator, in Japanese Patent Laid-Open No. 2014-000023 (Prior Document 001), the configuration of an open plant cultivator is disclosed which includes a hydroponic cultivation unit, a base part supporting the hydroponic cultivation unit, and a lighting part that emits light to the hydroponic cultivation unit.

Here, the hydroponic cultivation unit is equipped with a medium suitable for hydroponic cultivation of plants and corresponds to a configuration referred to as a cultivation pod or a cultivation pot in the related technical field.

However, in the plant cultivator disclosed in prior document 001, the lighting part that generates light necessary for plant growth is composed of a small number of light-emitting elements.

Therefore, it is not suitable for cultivating a large amount of plants due to a very low amount of light, and it is impossible to supply light suitable for plant growth, so there is a problem in that the efficiency of the lighting part is significantly lowered.

DISCLOSURE

Technical Problem

The present disclosure was conceived to solve the problems of the prior art described above, and an first object of the present disclosure is to provide a plant cultivator that is capable of improving efficiency of a light source part by being configured to be capable of adjusting the vertical position of a handle and a light source port using a pair of spacers so that the height of the light source part is capable of being adjusted according to the plant growth stage.

In addition, a second object of the present disclosure is to provide a plant cultivator that is capable of reducing manufacturing costs by supplying power to the light source part using one of a pair of spacers.

In addition, a third object of the present disclosure is to provide a plant cultivator that is capable of fundamentally preventing the occurrence of power supply interruption phenomenon that may occur due to misassembly/misconnection of a pair of spacers by providing means for preventing misassembly/misconnection of a pair of spacers.

The objects of the present disclosure are not limited to the objects mentioned above, and other objects and advantages of the present disclosure that are not mentioned can be understood by the following description and will be more clearly understood by the embodiments of the present disclosure. Additionally, it will be readily apparent that the objects and advantages of the present disclosure can be realized by the means and combinations thereof indicated in the patent claims.

Technical Solution

A plant cultivator according to the present disclosure includes a cultivation port part; a main body part on which the cultivation port part is detachably disposed; a light source part configured to emit light toward the cultivation port part; a housing disposed above the main body part and configured to accommodate the light source part; and a spacer configured to connect the housing and the main body part; in which, when the spacer is connected to the housing and the main body part, a separation distance between the cultivation port part and the light source part increases.

In addition, the light source part may receive power from the main body part through the spacer.

In addition, the spacer may include a connector part configured to transmit the power from the main body part to the light source part.

In addition, the spacer may further include a first spacer having an upper end portion which is coupled to one end portion of the housing and a lower end portion which is coupled to the main body part; and a second spacer having an upper end portion which is coupled to the other end portion of the housing and a lower end portion which is coupled to the main body part, and the connector part may be disposed on the first spacer.

In addition, the connector part may be not disposed on the second spacer.

In addition, the connector part may include a male connector disposed on one end portion of the first spacer; a female connector disposed on the other end portion of the first spacer; and a power transmission cable configured to electrically connect the male connector and the female connector.

In addition, the first spacer may include a first spacer body which is hollow and has one end portion and the other end portion open, respectively; a first spacer insert disposed at one end portion of the first spacer body and configured to close the open the one end portion of the first spacer body; and a first spacer fitting part disposed at the other end portion of the first spacer body and configured to close the open the other end portion of the first spacer body; the male connector may be fixed to the first spacer insert, the female connector may be fixed to the first spacer fitting part, and the power transmission cable may be disposed inside the first spacer body.

In addition, at one end portion of the housing, a first fitting part coupled to the first spacer insert may be provided, and a female connector electrically connectable to the male connector of the first spacer may be disposed in the first fitting part.

In addition, the main body part may include a first main body insert coupled to the first spacer fitting part, and a male connector electrically connectable to the female connector of the first spacer and electrically connectable to a female connector of the housing may be disposed on the first main body insert.

In addition, the male connector provided in the first main body insert may be configured to electrically connected to a female connector provided in the first fitting part of the housing.

In addition, the upper end portion of the first spacer may be configured not to be coupled with the other end portion of the housing.

In addition, a first insert body protruding upward and having a first insertion space therein may be provided on the upper end portion of the first spacer, a second insert body protruding upward and having a second insertion space therein may be provided on the upper end portion of the second spacer, as an inside of the housing, a first fitting main body protruding downward and configured to be capable of being inserted into the first insertion space may be provided on one end portion of the housing, as an inside of the housing, a second fitting main body protruding downward and configured to be capable of being inserted into the second insertion space may be provided on the other end portion of the housing, and a width of the lower end of the second fitting main body in the front and rear direction may be larger than a width of the upper end of the first insertion space in the front and rear direction.

In addition, a width of the lower end of the first fitting main body in the front and rear direction may be smaller than a width of the upper end of the second insertion space in the front and rear direction.

In addition, the width of the upper end of the second insertion space in the front and rear direction may be larger than a width of the lower end thereof in the front and rear direction.

Advantageous Effect

The plant cultivator according to the present disclosure has the effect of being capable of improving efficiency of a light source part by being configured to be capable of adjusting the vertical position of a handle and a light source port using a pair of spacers so that the height of the light source part is capable of being adjusted according to the plant growth stage.

In addition, the plant cultivator according to the present disclosure has the effect of being capable of reducing manufacturing costs by supplying power to the light source part using one of a pair of spacers.

In addition, the plant cultivator according to the present disclosure has the effect of being capable of fundamentally preventing the occurrence of power supply interruption phenomenon that may occur due to misassembly/misconnection of a pair of spacers by providing means for preventing misassembly/misconnection of a pair of spacers.

In addition to the above-described effects, specific effects of the present disclosure are described below while explaining specific details for carrying out the disclosure.

BEST MODE

Figure 1:
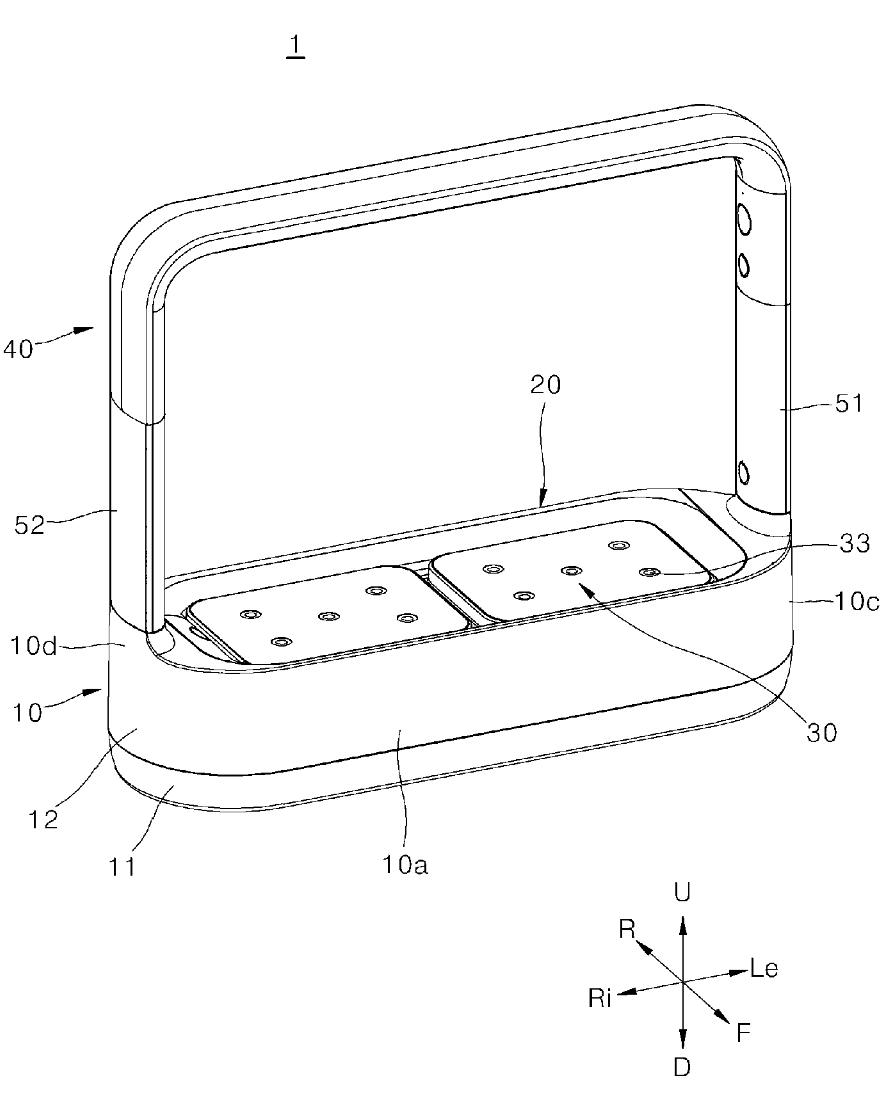
FIG. 1 is a front perspective view of a plant cultivator according to a first embodiment of the present disclosure.

The objects, features, and advantages described above will be described in detail later with reference to the attached drawings, so that those skilled in the art will be able to easily implement the technical idea of the present disclosure. In describing the present disclosure, if it is determined that a detailed description of known technologies related to the present disclosure may unnecessarily obscure the subject matter of the present disclosure, the detailed description will be omitted. Hereinafter, preferred embodiments according to the present disclosure will be described in detail with reference to the attached drawings. In the drawings, identical reference numerals are used to indicate identical or similar components.

Although first, second, or the like is used to describe various components, these components are, of course, not limited by these terms. These terms are only used to distinguish one component from another component, and unless specifically stated to the contrary, the first component may also be a second component.

Throughout the specification, unless otherwise stated, each component may be singular or plural.

Hereinafter, the disposition of any component on the "upper portion (or lower portion)" of a component or the "top (or bottom)" of a component may mean that any component is disposed in contact with the upper surface (or lower surface) of the component and other components is interposed between the component and any element disposed on (or under) the component.

Additionally, when a component is described as being "connected," "coupled," or "joined" to another component, it should be understood that the components may be directly connected or joined to each other, but the other component is "interposed" between components, or each component may be "connected," "combined," or "joined" through other components.

As used herein, singular expressions include plural expressions unless the context clearly dictates otherwise. In the present application, terms such as "consists of" or "comprises" should not be construed as necessarily including all of the various components or steps described in the specification, and should be construed as not including some of the components or steps, or as including additional components or steps.

In addition, as used herein, singular expressions include plural expressions unless the context clearly dictates otherwise. In the present application, terms such as "consists of" or "comprises" should not be construed as necessarily including all of the various components or steps described in the specification, and should be construed as not including some of the components or steps, or as including additional components or steps.

Throughout the specification, when referred to as "A and/or B", this means A, B or A and B, unless specifically stated to the contrary, and when referred to as "C to D", this means that it is C or higher and D or lower, unless specifically stated to the contrary.

Overall Structure of the Plant Cultivator

Hereinafter, the overall structure of the plant cultivator 1 according to the present disclosure will be described in detail with reference to the attached drawings.

Figure 2:
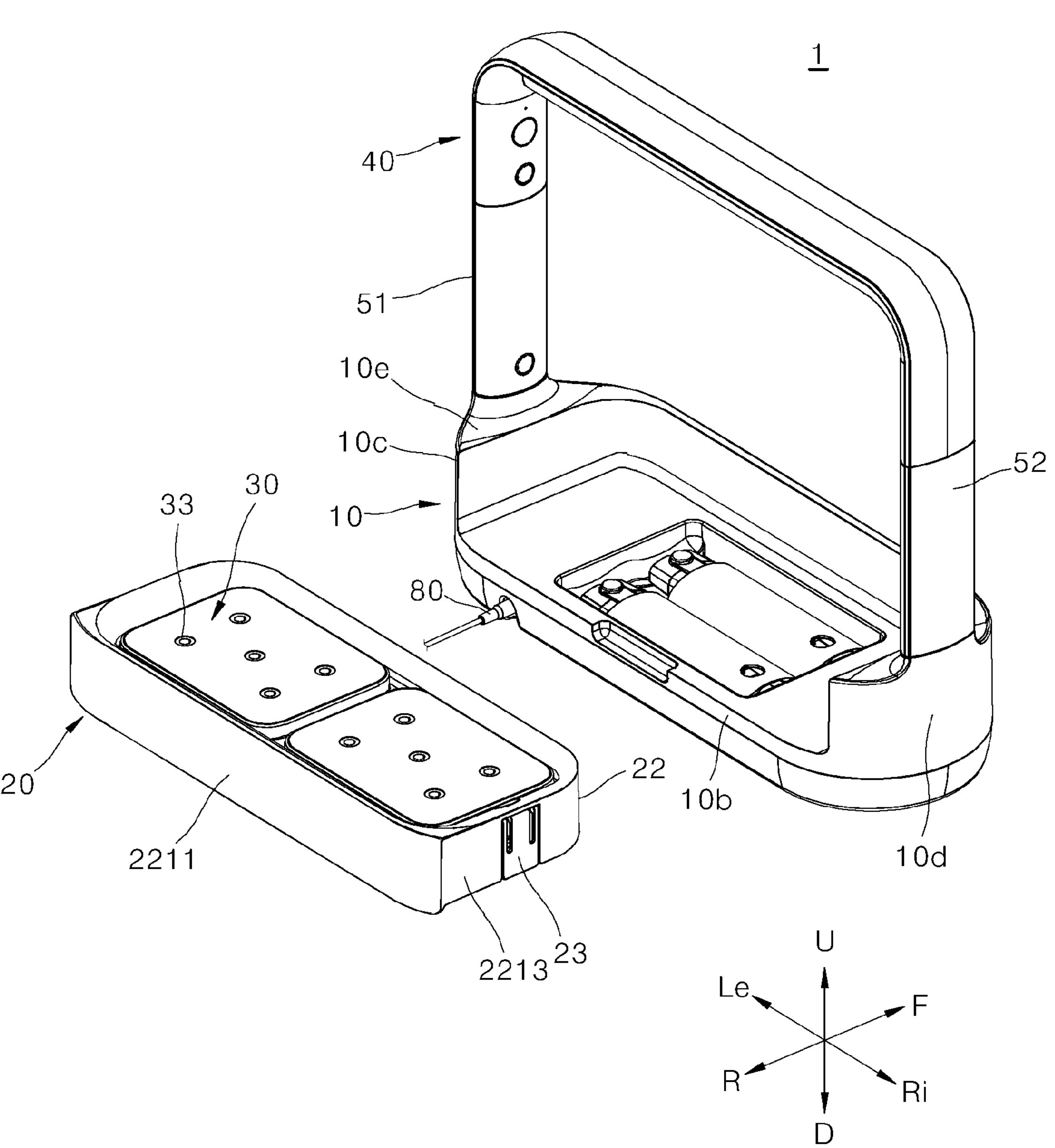
FIG. 2 is a rear perspective view of the plant cultivator illustrated in FIG. 1.
Figure 3:
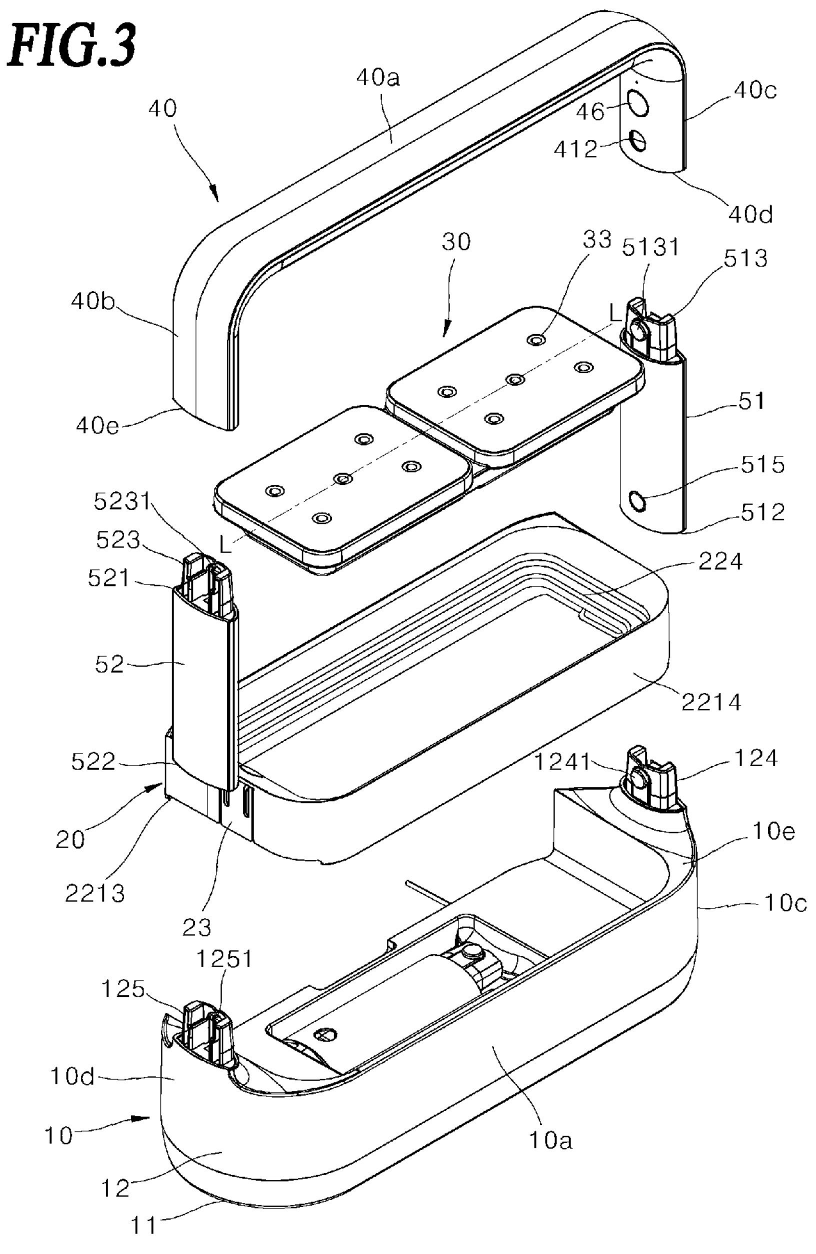
FIG. 3 is an exploded perspective view of FIG. 1.
Figure 4:
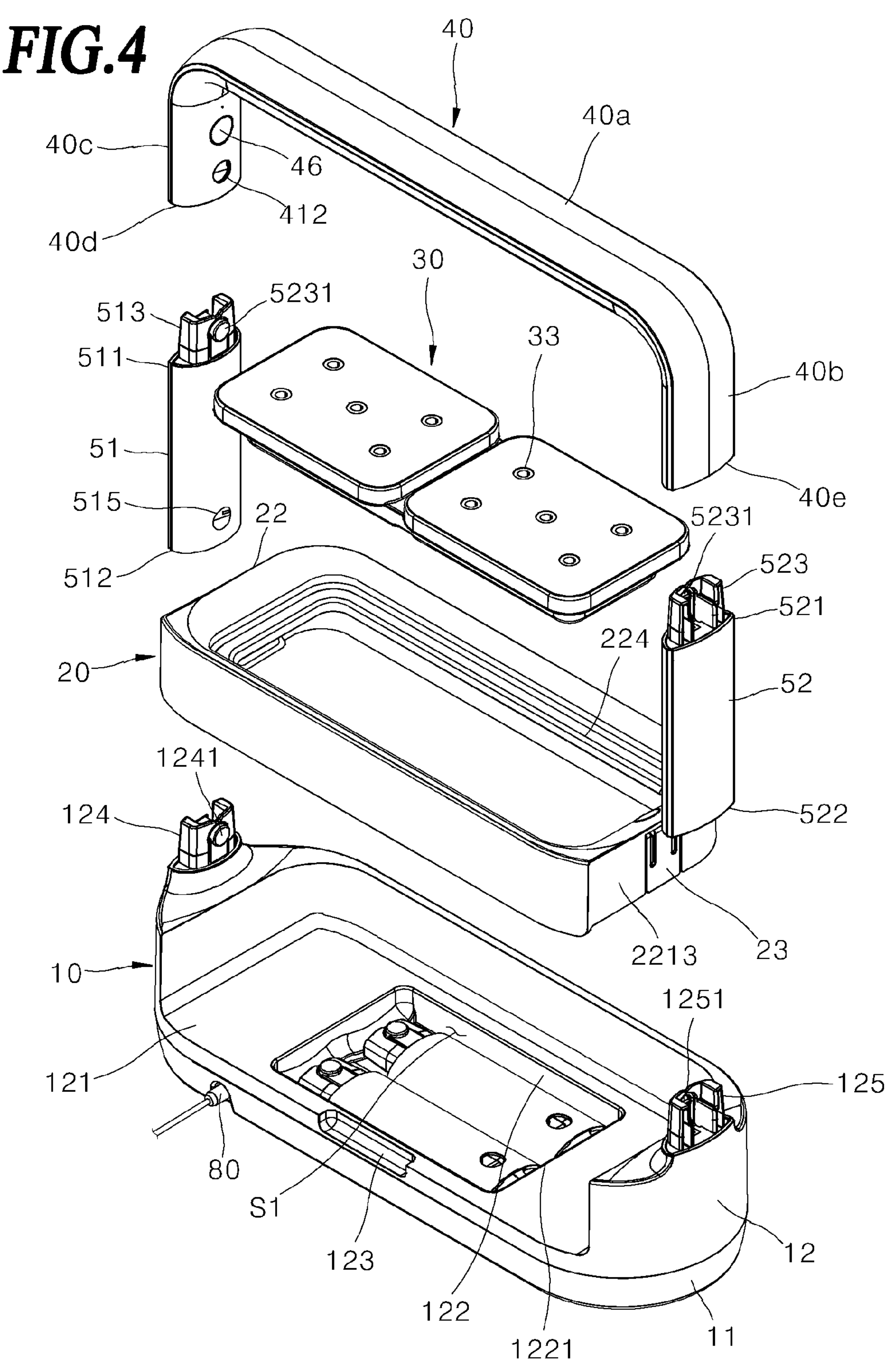
FIG. 4 is an exploded perspective view of FIG. 2.

FIG. 1 is a front perspective view of a plant cultivator 1 according to a first embodiment of the present disclosure, FIG. 2 is a rear perspective view of the plant cultivator 1 illustrated in FIG. 1, FIG. 3 is an exploded perspective view of FIG. 1, and FIG. 4 is an exploded perspective view of FIG. 2.

As illustrated in FIGS. 1 to 4, the plant cultivator 1 according to the first embodiment of the present disclosure may include a cultivation port part 30 provided with at least one medium 33 for plant growth, a water tank part 20 on which the cultivation port part 30 is mounted and which stores cultivation water to be supplied to the medium 33, a main body part 10 to which the water tank part 20 is detachably coupled, and a handle part 40 disposed on the upper side of the main body part 10 and provided with a light source part 60.

As described above, the plant cultivator 1 according to the present disclosure is an open type, not a closed type.

Accordingly, at least the upper surface of the cultivation port part 30, where plants are cultivated and grown, is exposed to the indoor environment, that is, indoor air. More specifically, considering the characteristic of plants having a growth direction that generally grows in an upward direction (U-direction) opposite to the direction of gravity, the upper surface of the cultivation port part 30 is entirely open and exposed to the indoor environment.

In addition, the cultivation port part 30 in the present disclosure is modularized to be compatible with the above-described closed plant cultivator.

In other words, after germinating seeds in the plant cultivator 1 of the present disclosure, plants can be grown by moving and placing the cultivation port part 30 in a closed plant cultivator that can provide a better cultivation environment.

Conversely, the cultivation port part 30, which is being used in a closed plant cultivator, can be moved to the plant cultivator 1 to grow plants. As will be described later, since the height of the light source part 60 of the present disclosure can be adjusted, it can be preferably applied when it is desired to grow plants that are difficult to grow in a closed plant cultivator due to the growth height of the plants by moving them to the plant cultivator 1.

Meanwhile, the cultivation port part 30 may be assembled and seated in the water tank part 20, which will be described later, in a non-fastening manner.

Here, the meaning of being assembled in a non-fastening manner to the water tank part 20 means that the cultivation port part 30 can be assembled with the water tank part 20 without a separate fastening means, and means that it has a structure that the cultivation port part 30 cannot move by itself due to its own weight in a state of being assembled and seated, but can be easily separated and removed without separate disassembly operation.

In particular, as illustrated in FIG. 3, the cultivation port part 30 may have a symmetrical shape with respect to the dividing line L dividing the front and rear direction (F-R direction). Therefore, when it is removed from the water tank part 20 and then mounted again, it can be configured to be mounted even with the front and back sides reversed.

In this case, the cultivation port part 30 can be supported in the direction of gravity on the water tank part 20 and can be assembled by simply mounting it on the water tank part 20.

Therefore, when the user wants to move the cultivation port part 30 to a closed plant cultivator or separate the cultivation port part 30 from the water tank part 20 to replenish cultivation water, the cultivation port part 30 may be easily removed simply by lifting the cultivation port part 30 in the upward direction (U-direction) without a separate disassembly operation. Accordingly, user convenience may be improved.

To allow the user to easily hold the cultivation port part 30 to separate it, a cultivation port holding space S3 may be formed between the upper end of the cultivation port part 30 and the water tank part 20.

Meanwhile, the cultivation port part 30 may be provided with a plurality of media 33 to support the plants and protect the roots of the plants.

The medium 33 may be made of a porous material that facilitates the absorption of culture water and is advantageous for plant root growth. Since any configuration known in the art can be applied to the medium 33, description of the detailed configuration will be omitted.

Meanwhile, the drawing illustrates an embodiment in which a total of 10 media 33 are divided into two locations and provided in the cultivation port part 30. The number of media 33 may be changed and provided differently according to the size of the cultivation port part 30. The present disclosure is not limited to this, but will be described based on an embodiment in which a total of 10 media 33 are divided into two locations and provided in the cultivation port part 30, as illustrated.

The water tank part 20 disposed at the lower portion of the cultivation port part 30 mounts the cultivation port part 30 and serves to support the cultivation port part 30 and to store culture water to be supplied to the plants.

To this end, the water tank part 20 may include a water tank body 21 that stores cultivation water, and a water tank cover 22 that supports the cultivation port in a mounted manner.

A mounting surface 224 may be formed on the upper side of the water tank cover 22 to support the cultivation port part and to set the position of the cultivation port part. An insertion hole 225 may be formed inside the mounting surface 224 into which the lower end of the cultivation port part is inserted.

The water tank body 21 and the water tank cover 22 may be detachably coupled to each other through a separate fastening means, and for example, the detachment means may be a fastening lever 23 having one end portion which may be rotatably connected to either the water tank body 21 or the water tank cover 22 and the other end portion which may be engaged with either the water tank body 21 or the water tank cover 22.

The water tank part 20 may have an overall rectangular shape with a width in the left and right direction (Le-Ri direction) that is larger than the front and rear direction (F-R direction) and may have any height in a vertical direction (U-D direction) sufficient to accommodate the cultivation port part as a whole.

The water tank part 20 may be made of a lightweight material while maintaining a predetermined strength. Preferably, the water tank body 21 and the water tank cover 22 of the water tank part 20 may be manufactured through plastic injection molding.

At this time, the water tank body 21 and the water tank cover 22 that constitute the water tank part 20 may be made of an opaque plastic material.

Furthermore, as described above, the upper end of the cultivation port part 30, to which light is directly emitted from the light source part 60, which will be described later, may be made of an opaque plastic material.

Therefore, most of the light emitted from the light source part 60 cannot reach the cultivation water stored inside the water tank part 20, and the possibility of moss growing inside the water tank part 20 and the amount of moss growth may be minimized.

Meanwhile, the rear surface 2211 of the outer wall surface 221 of the water tank cover 22 forming the outer surface of the water tank part 20 is directly exposed to the outside when coupled to the main body part 10, which will be described later, and forms a portion of the rear surface of the plant cultivator 1. At this time, in order to form a sense of unity, the rear surface 2211 of the water tank cover 22 forms a continuous surface with the outer surfaces 10*c* and 10*d* of the main body part 10.

The water tank part 20 is coupled to and seated on the main body part 10 in a non-fastening manner, similar to the cultivation port part 30 described above. Therefore, the water tank part 20 can be mounted on the main body part 10 without a separate fastening means.

Accordingly, the user can separate the water tank part 20 from the main body part 10 or seat it on the main body part 10 without a separate uncoupling or coupling operation.

When attempting to separate the water tank part 20 while the water tank part 20 is seated on the main body part 10, the water tank part 20 can be easily separated through manipulation that the user simply lifts it while holding the water tank part 20.

As the lower portion of the water tank part 20, a holding groove part 123 may be formed on the rear surface 10*b* of the main body part 10 to enable the user to effectively hold.

The width and height of the holding groove part 123 may be formed to have a size that allows the user's fingers to easily enter.

As will be described later, in response to this, a water tank holding space S2 may be formed in the lower portion of the water tank part 20, having a depth sufficient for the user's fingers to enter so that the user can effectively grasp the water tank part.

Meanwhile, the water tank part 20 may be provided with positioning means to set a correct position to be seated and prevent the water tank part 20 from removing from the correct position.

Such a positioning means may be provided on the water tank body 21, and for example, the positioning means may be a guide rib integrally formed on the lower surface of the water tank body 21.

The guide rib may have an outer shape corresponding to the shape of the upper entrance 1221 of the engaging groove part 122 so that it can be inserted into the engaging groove part 122 formed in the main body part 10, which will be described later.

The seating position of the water tank part 20 may be accurately guided by the guide rib and the engaging groove part 122. When insertion of the guide rib is completed, the engaging groove part 122 may act as a stopper for the guide rib, and thus may restrict the relative movement in the front and rear direction (F-R direction) and the relative movement in the left and right direction (Le-Ri direction) with respect to the main body part 10.

By restricting the relative movement of the water tank part 20 in this way, the water tank part 20 can be effectively prevented from removing from its correct position.

Meanwhile, the main body part 10 disposed below the water tank part 20 serves to accommodate the water tank part 20 and support the handle part 40, which will be described later.

In order to accommodate the water tank part 20, the upper surface 10*e* and the rear surface 10*b* of the main body part 10 are mostly open corresponding to the shape of the water tank part 20. The front surface 10*a* of the main body part 10 is closed to form the front surface of the plant cultivator 1.

The front surface 10*a* of the main body part 10 may be formed in the form of a flat surface. The forward movement of the water tank part 20 may be blocked by the front surface 10*a* of the main body part 10.

The left side 10*c* and the right side 10*d* of the main body part 10 may be provided in an arcuate shape with a predetermined curvature.

For example, the main body part 10 may be provided in a divided form in the vertical direction (U-D direction). These vertically divided bodies may include a first main body 11 corresponding to the lower divided body and a second main body 12 corresponding to the upper divided body.

The first main body 11 and the second main body 12 may each be manufactured through plastic injection molding. For example, similar to the water tank part 20, they may each be made from an opaque plastic material and then combined.

The present disclosure is not limited to this, but will be described below based on an embodiment in which the main body part 10 is formed by combining the first main body 11 and the second main body 12.

The water tank part 20 is coupled to and accommodated in the second main body 12.

As described above, an engaging groove part 122 engaging with the guide rib of the water tank part 20 may be formed on the bottom surface 121 where the water tank part 20 is coupled to the second main body 12.

As illustrated in FIG. 4, the engaging groove part 122 may be a concave groove part convex downward from the bottom surface 121 of the second main body 12 toward the first main body 11.

The shape of the upper inlet 1221 of the engaging groove part 122 may be configured to have a shape corresponding to the outer shape of the guide rib of the water tank part 20. The upper inlet 1221 of the engaging groove part 122 serves as a stopper that prevents relative movement of the guide rib of the water tank part 20 when the water tank part 20 is seated.

In addition to the stopper function of the guide rib, the engaging groove part 122 may perform the function of providing a space for storing spacers 51 and 52, which will be described later.

When the first spacer 51 and the second spacer 52 are separated from the main body part 10 and the handle part 40, respectively, both the separated first spacer 51 and the second spacer 52 may be accommodated inside the engaging groove part 122.

Accordingly, the inner space of the engaging groove part 122 becomes a storage space S1 in which the first spacer 51 and the second spacer 52 can be accommodated at the same time.

Inside the storage space S1, a shape part corresponding to the outer shape of the first spacer 51 and the second spacer 52 is provided so that the first spacer 51 and the second spacer 52 may be maintained in the stored state.

Meanwhile, as described above, the main body part 10 also serves to support the handle part 40.

In order to support the handle part 40 disposed on the upper side of the main body part 10*a*, first main body insert 124 may be provided on the upper left side of the second main body 12, and a second main body insert 125 may be provided on the upper right side of the second main body 12.

The first main body insert 124 may be coupled to an inside of the first end portion 40*d* of the handle part 40 in a manner that is coupled to a first handle fitting part 43 provided inside the first end portion 40*d* of the handle part 40, which will be described later.

Likewise, the second main body insert 125 may be coupled to an inside of the second end portion 40*e* of the handle part 40 in a manner that is coupled to a second handle fitting part 44 provided inside the second end portion 40*e* of the handle part 40.

The first main body insert 124 and the second main body insert 125 have cross sections of the upper end portions 511 and 521 that are smaller than the cross sections of the lower end portions 512 and 522 to facilitate entry into the first end portion 40*d* and the second end portion 40*e*.

Meanwhile, unlike the water tank part 20 and the cultivation port part 30, the handle part 40 may be coupled by a fastening method.

The first main body insert 124 and the second main body insert 125 may provide a force coupling means. By way of example, the forced coupling means of the fastening method may be elastic coupling parts 1241, 1251.

These elastic coupling parts 1241, 1251 may be provided in the first main body insert 124 and the second body insert 125, respectively, and the first main body insert 124 and the second body insert 125 are elastically deformed as they enter the first end portion 40*d* and the second end portion 40*e* of the handle part 40.

Afterwards, when the coupling of the first main body insert 124 and the second main body insert 125 is completed, while the elastic coupling parts 1241 and 1251 elastically return to their original shape thereof, the elastic coupling parts 1241 and 1251 acts to form an engagement with the first end portion 40*d* and the second end portion 40*e* of the handle part 40.

At the first end portion 40*d* and the second end portion 40*e* of the handle part 40, there is a coupling hole 412 having a shape corresponding to the outer shape of the elastic coupling parts 1241 and 1251 so that such an engagement coupling can be formed.

In order to separate the handle part 40 and the main body part 10 after completion of fastening, the separation can be done by pressing the elastic coupling parts 1241 and 1251 to elastically deform so that the elastic coupling parts 1241 and 1251 engaged with the coupling hole 412 are removed from the coupling hole 412.

However, the present disclosure is not limited to the forced coupling method using the elastic coupling parts 1241 and 1251 and the coupling hole 412, and in addition to this, any forced coupling means known in the art may be applied. Detailed description will be omitted below.

Meanwhile, as will be described later, power supply to the light source part 60 provided in the handle part 40 is provided only through the first handle fitting part 43, and for this purpose, the first main body insert 124 and the first handle joint part 43 may be provided with a connector for power supply.

Therefore, if the first main body insert 124 is incorrectly assembled or misconnected, such as when the first main body insert 124 is coupled to the second handle fitting part 44, power cannot be supplied to the light source part 60.

To prevent this, the first handle fitting part 43 and the second handle fitting part 44 may be provided with means for preventing misassembly or misconnection.

Meanwhile, the first main body 11 constituting the lower divided body of the main body part 10 may be provided with a power input terminal through which external power 80 is input. Although not illustrated, the power input terminal may be provided on the first main body 11 in the form of an outlet.

Additionally, the first main body 11 is in direct contact with a fixed surface such as the ground and a table and is supported on the fixed surface.

Therefore, although not illustrated, anti-slip pads for shock absorption and slip prevention may be provided at a plurality of locations on the lower side of the lower surface of the first main body 11. For shock absorption and anti-slip functions, the anti-slip pad may be made of a rubber material with certain elasticity.

Meanwhile, the above-described spacers 51 and 52 may be connected between the handle part 40 and the main body part 10.

A pair of spacers 51 and 52 are used to adjust the height of the handle part 40. In particular, the handle part 40 is provided with a light source element 62 constituting the light source part 60, as will be described later. Therefore, the plant cultivator 1 according to the present disclosure has the feature of being able to adjust the height of the light source element 62 using the spacers 51 and 52. In other words, when a pair of spacers 51 and 52 are connected between the handle part 40 and the main body part 10, the vertical separation distance between the cultivation port part 30 and the light source part 60 may be increased. Therefore, since the light source part 60 may be moved upward to match the growth height of the plant, the emitting efficiency of the light source part 60 may be improved.

The detailed configuration of the spacers 51 and 52 will be described later with reference to FIG. 6 and below.

Meanwhile, the handle part 40 disposed on the upper side of the main body part 10 provides a handle function that the user can hold when moving the plant cultivator 1.

In addition, the handle part 40 may additionally perform the function of receiving and supporting the light source part 60 that emits light toward the cultivation port part 30. Accordingly, the handle part 40 may be referred to as a housing or holder of the light source part 60, considering its relationship to the light source part 60. Hereinafter, for convenience, the member that serves to accommodate and support the light source part 60 will be referred to as the handle part 40 and will be described.

Specifically, the handle part 40 may be provided with a horizontal extension part 40*a* extending across the upper side of the main body part 10 in the left and right direction. Inside the horizontal extension part 40*a*, the light source part 60 may be disposed to entirely cover the cultivation port part 30 in the left and right direction.

In this way, the light source part 60 is disposed on the horizontal extension part 40*a* so that the emission distance of the light generated from the light source part 60 toward the cultivation port part 30 is maintained constant.

Figure 5:
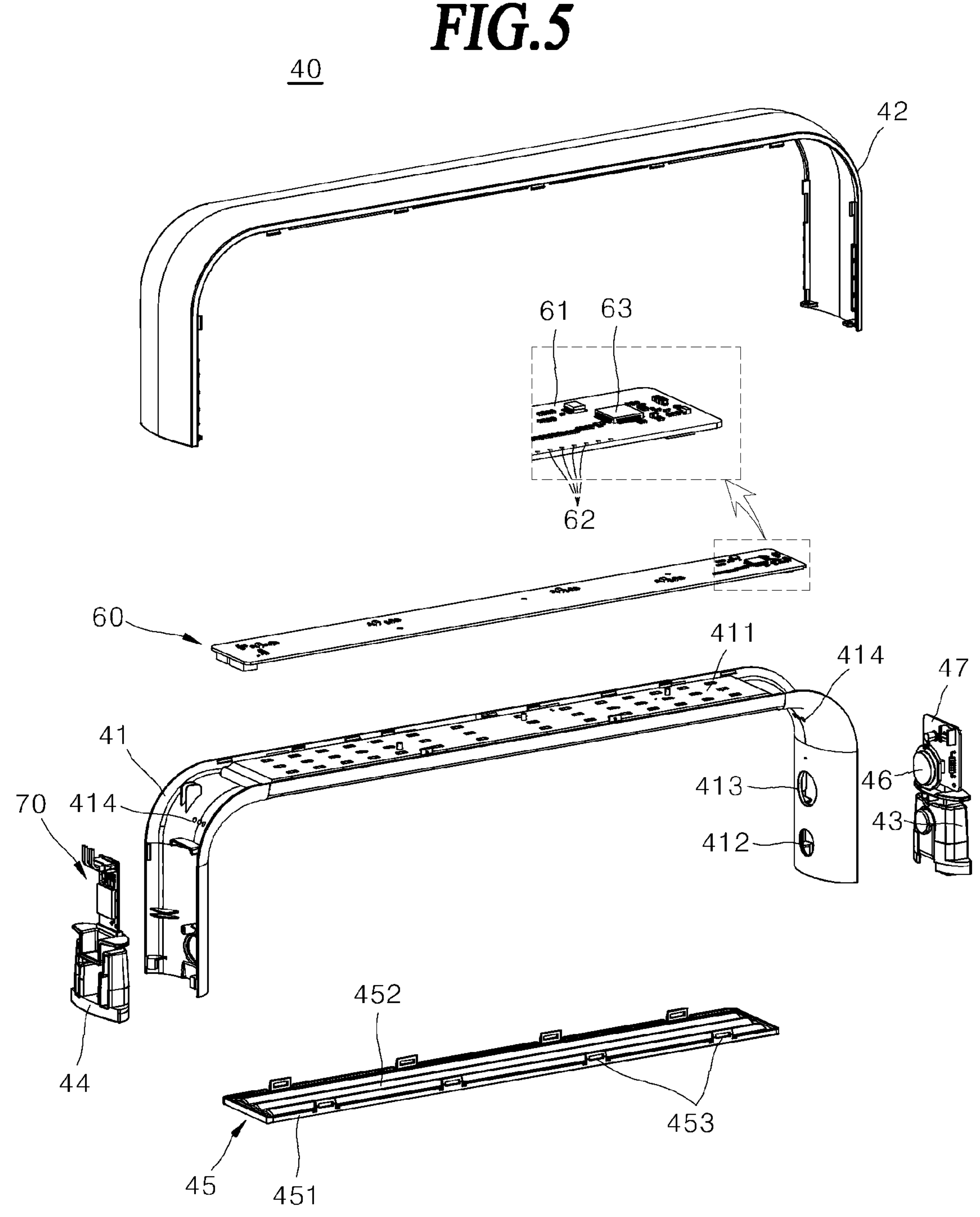
FIG. 5 is an exploded perspective view of the handle part illustrated in FIG. 1.

As illustrated in FIG. 5, the light source part 60 may include a circuit board 61 extending long in the left and right direction, a plurality of light source elements 62 disposed on the lower surface of the circuit board 61, and a controller 63 determining the power supply to a light source element 62.

Each light source elements 62 may be a light emitting diode chip or a package including a light emitting diode chip that can generate visible light by converting electrical energy into visible light. Hereinafter, the description will be based on an embodiment in which the each light source elements 62 is light emitting diode chips.

At this time, the visible light generated by the each light source elements 62 may be white light or red light having a wavelength range suitable for plant growth.

Only light emitting diode chips that generate white light may be disposed on the circuit board 61, or a combination of light emitting diode chips that generate white light and red light may be disposed on the circuit board 61.

The illustrated embodiment exemplarily illustrates an embodiment in which a plurality of light source elements 62 are disposed in three rows in the longitudinal direction of the circuit board 61. The present disclosure is not limited to this, but will be described based on an embodiment in which a plurality of light source elements 62 are arranged in three rows as illustrated.

Meanwhile, the spacing at which the plurality of light source elements 62 are arranged may vary according to the position where the each light source elements 62 is disposed.

As in the illustrated embodiment, the gap between the light source elements 62 arranged in the center of the substrate may be larger than the gap between the light source elements 62 arranged adjacent to both end portions of the substrate.

Meanwhile, the controller 63 disposed adjacent to the left end portion of the circuit board 61 plays a role in determining whether to supply power to the light source element 62, the power supply time, or the like.

The controller 63 may be provided in various forms, such as a microcontroller, microcomputer, or microprocessor, as is known in the art.

Meanwhile, the handle part 40 may include a first downward extension part 40*b* and a second downward extension part 40*c* extending downwardly from both end portions of the horizontal extension part 40*a*, respectively.

As illustrated, the first downward extension part 40*b* may be provided with a first handle fitting part 43, and a switch part 46 may be provided on the upper side of the first handle fitting part 43.

Additionally, the second downward extension part 40*c* may be provided with a second handle fitting part 44, and a wireless communication part 70 may be provided on the upper side of the second handle fitting part 44.

The switch part 46 is electrically connected to the above-described controller 63 and may be provided in the form of a push button as illustrated.

The switch part 46 is exposed to the outside through a switch hole 413 formed in the first handle body 41, which will be described later.

Accordingly, when the user operates the push button, the controller 63 can perform control to supply power to the light source element 62 or block the power supply according to the signal received from the push button. Additionally, the controller 63 can perform control to start or stop the operation of the wireless communication part 70 according to a signal received through a push button.

The wireless communication part 70 may, for example, be a WIFI module capable of two-way connection to the Internet network. The WIFI module can be electrically connected to the controller 63, and the controller 63 can be connected to the user's mobile terminal device through the WIFI module.

Furthermore, the controller 63 can exchange information with the above-mentioned closed plant cultivator and other plant cultivators through the WIFI module. Information about plants growing in each closed plant cultivator and other plant cultivators can be exchanged with each other. Here, information about the plant may include the species name of the plant, the number of days the plant grows, the time the light remains on, and the like.

Meanwhile, a status indicator light 47 may be disposed on the upper side of the switch part 46 to indicate whether the wireless communication part 70 is operating, through which the user can intuitively check whether the wireless communication part 70 is connected to the Internet network.

Additionally, similar to the main body part 10, the handle part 40 may be provided in a vertically divided form. These vertically divided bodies may include a first handle body 41 corresponding to the lower divided body and a second handle body 42 corresponding to the upper divided body.

The first handle body 41 and the second handle body 42 may each be manufactured through plastic injection molding, and for example, for the emission efficiency of the light element 62, each may be manufactured from an opaque plastic material and then combined.

Between the first handle body 41 and the second handle body 42, an accommodation space that can communicate between the first end portion 40*d* and the second end portion 40*e* may be formed, and the light source part 60, the wireless communication part 70, or the like, which is described above, may be accommodated in the accommodation space.

In addition, in this way, an air flow path for cooling the light source part 60 can be formed through the accommodation space that can communicate between the first end portion 40*d* and the second end portion 40*e*.

A plurality of ventilation holes 414 may be formed in the first handle body 41 to allow air to flow in and out of the air flow path.

As illustrated in FIG. 5, some of the plurality of ventilation holes 414 illustrated may be formed in the first downward extension part 40*b* and the remaining portions may be formed in the second downward extension part 40*c*.

Meanwhile, a plurality of light transmission holes 411 open toward the cultivation port part 30 may be formed in the first handle body 41.

A plurality of light transmission holes 411 may be provided in one-to-one correspondence with the plurality of light source elements 62 described above.

A light condensing structure may be formed in each light transmission hole 411 so that the light generated by the corresponding light source element 62 can be efficiently emitted to the cultivation port part 30.

In addition, the handle part 40 may further include a transparent cover 45 on the lower portion of the first handle body 41 that covers the plurality of light transmitting holes 411 in the downward direction.

As illustrated, the transparent cover 45 is provided with a transparent plate 451 made of a transparent material so that the light generated by the light source element 62 can be effectively transmitted.

Between the transparent plate 451 and the plurality of light transmission holes 411, light condensing lens parts 452 arranged in three rows corresponding to the arrangement direction of the light source elements 62 arranged in three rows may be provided.

The light condensing lens part 452 may be configured to have the shape of a convex lens that is formed to be convex upward toward the light transmitting hole 411 in order to increase the light condensing efficiency of the light passing through the light transmitting hole 411.

Accordingly, the amount of diffusion of light passing through the light condensing lens part 452 is minimized and converges toward the cultivation port part 30, so that the emission efficiency of the light source element 62 may be improved.

Meanwhile, a plurality of fastening tabs 453 for hook-type fixation to the first handle body 41 may be integrally provided at the front and rear edges of the transparent plate 451.

Detailed Configuration of Spacer

Hereinafter, the detailed configuration of the spacers 51 and 52 will be described with reference to FIG. 6 and below.

Figure 6:
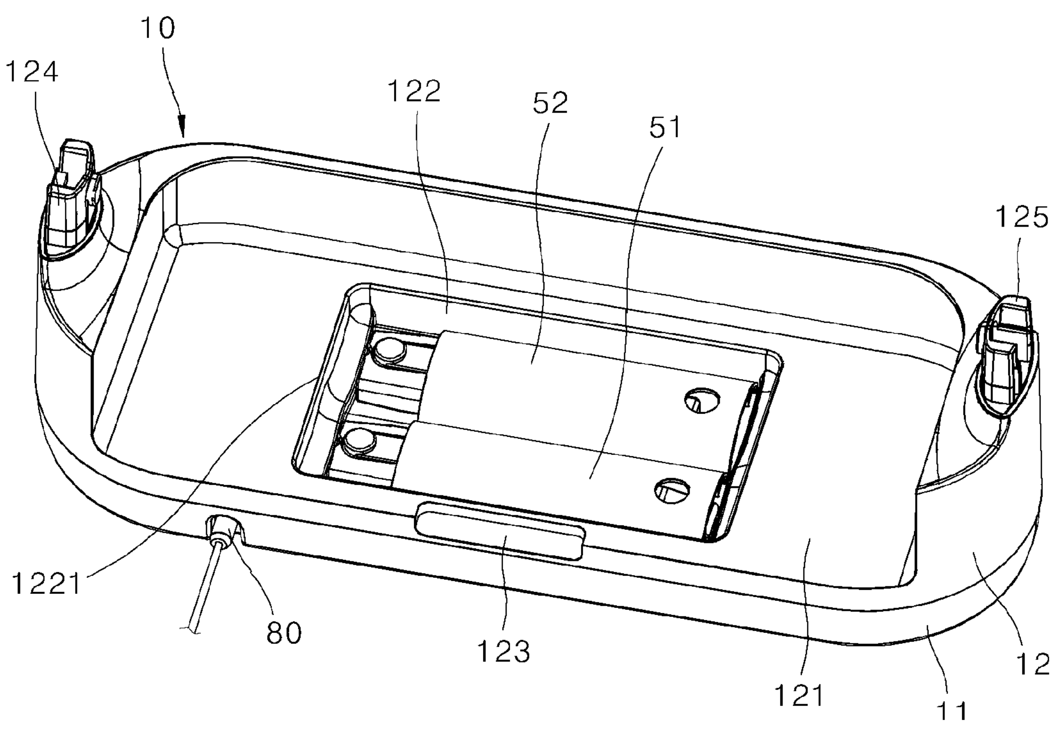
FIG. 6 is a rear perspective view illustrating a pair of spacers accommodated in the storage space of the main body.
Figure 7:
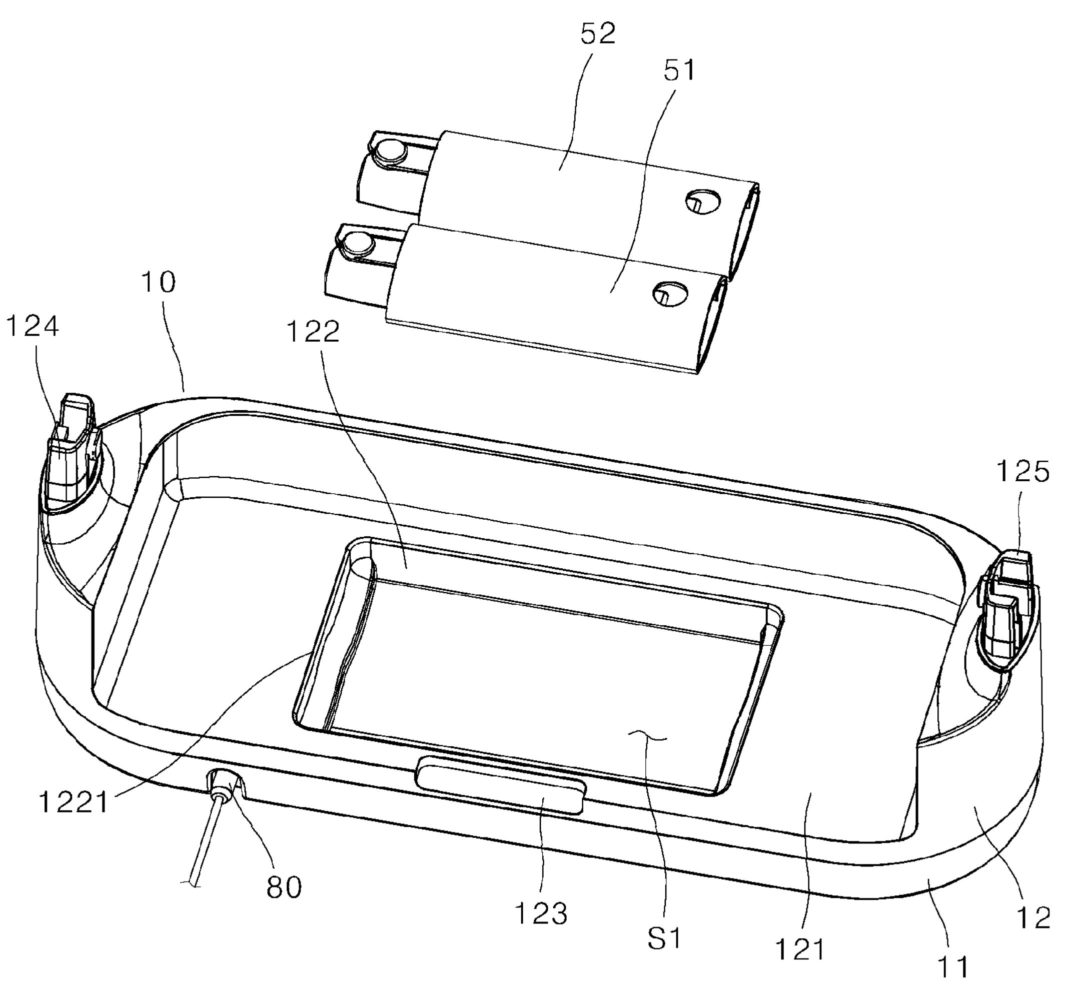
FIG. 7 is a partially enlarged view illustrating a state where a pair of spacers are separated from the stored state illustrated in FIG. 6.

First, referring to FIGS. 6 and 7, when the pair of spacers 51 and 52 are not in use, they can be stored in the storage space S1 formed in the main body part 10.

As described above, the engaging groove part 122 may be provided in a downwardly convex shape on the bottom surface 121 of the second main body 12.

In addition, when the water tank part 20 is seated on the upper inlet 1221 of the engaging groove part 122, the open upper surface of the engaging groove part 122 can be entirely closed by the water tank body 21.

Therefore, as illustrated, when the water tank part 20 is coupled with the pair of spacers 51 and 52 seated in the storage space S1, the storage space S1 is closed and hidden rather than exposed to the outside.

Accordingly, since the pair of spacers 51 and 52 may be stored in a hidden state without affecting the outer appearance of the plant cultivator 1, the risk of the pair of spacers 51 and 52 being lost or damaged may be significantly reduced.

As illustrated in FIG. 7, the inner bottom surface of the storage space S1 may have a shape part having a shape corresponding to the outer appearance of the pair of spacers 51 and 52 so that the pair of spacers 51 and 52 can be stored in parallel.

Figure 8:
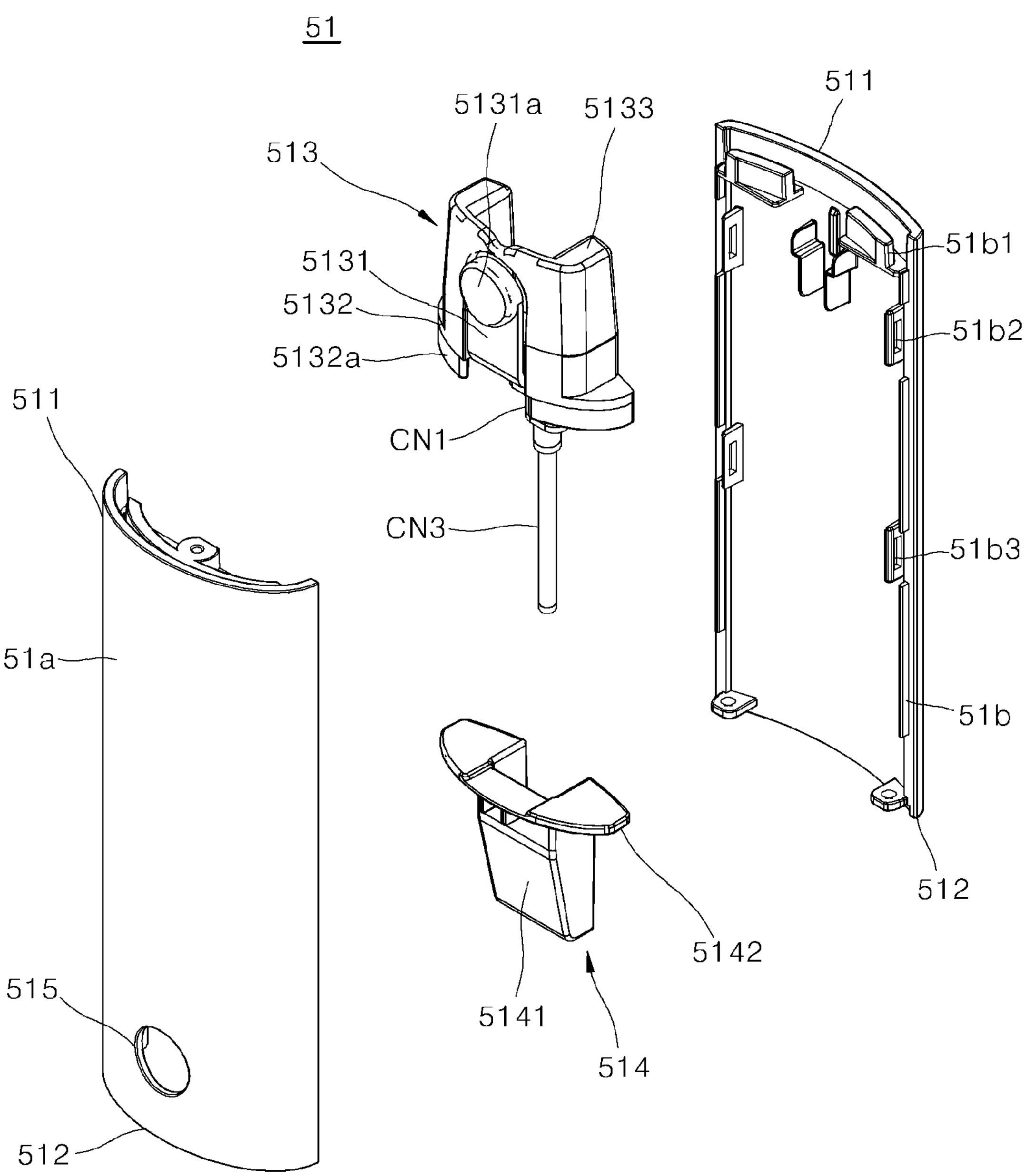
FIGS. 8 and 9 are exploded perspective views of the first spacer of a pair of spacers.
Figure 9:
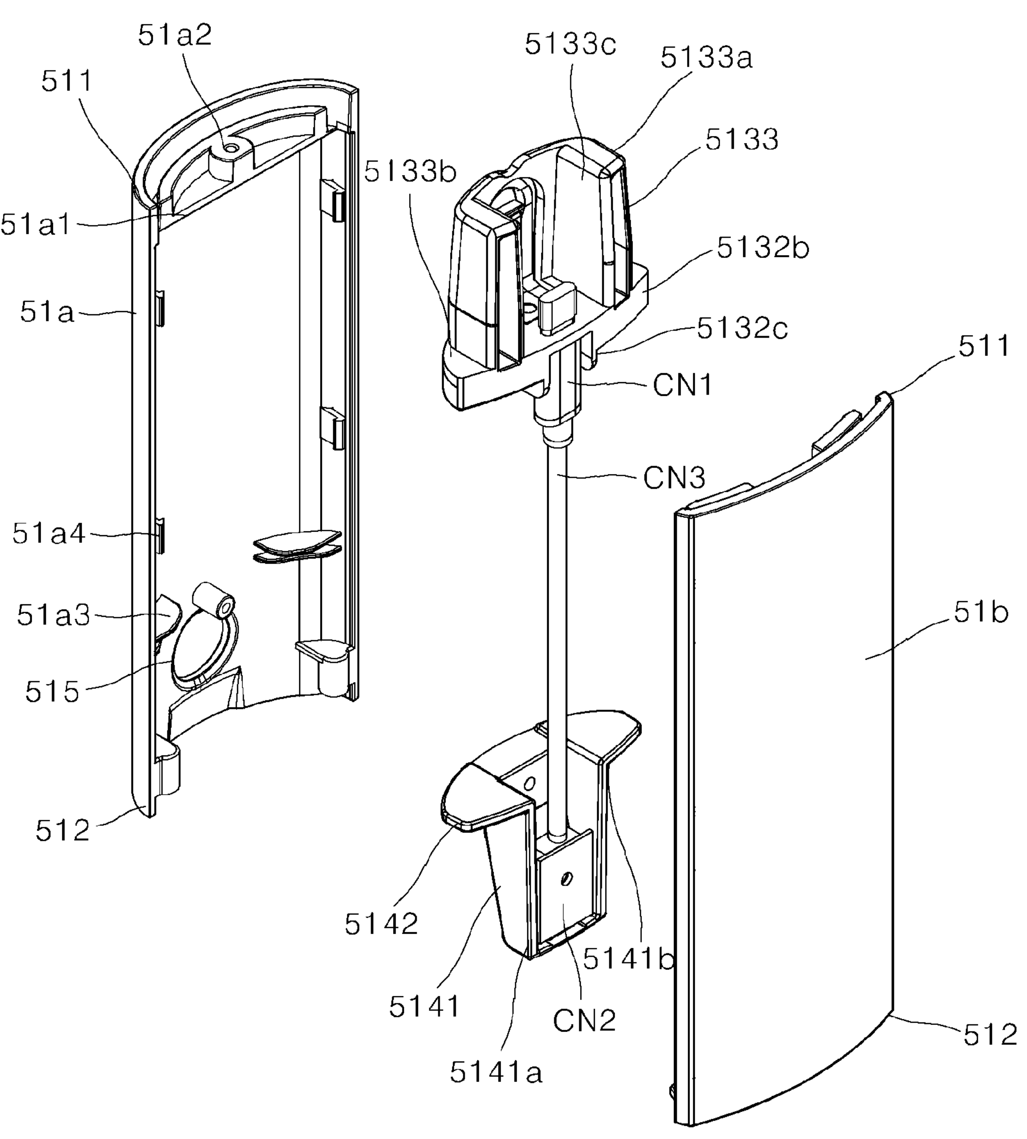
Figure 10:
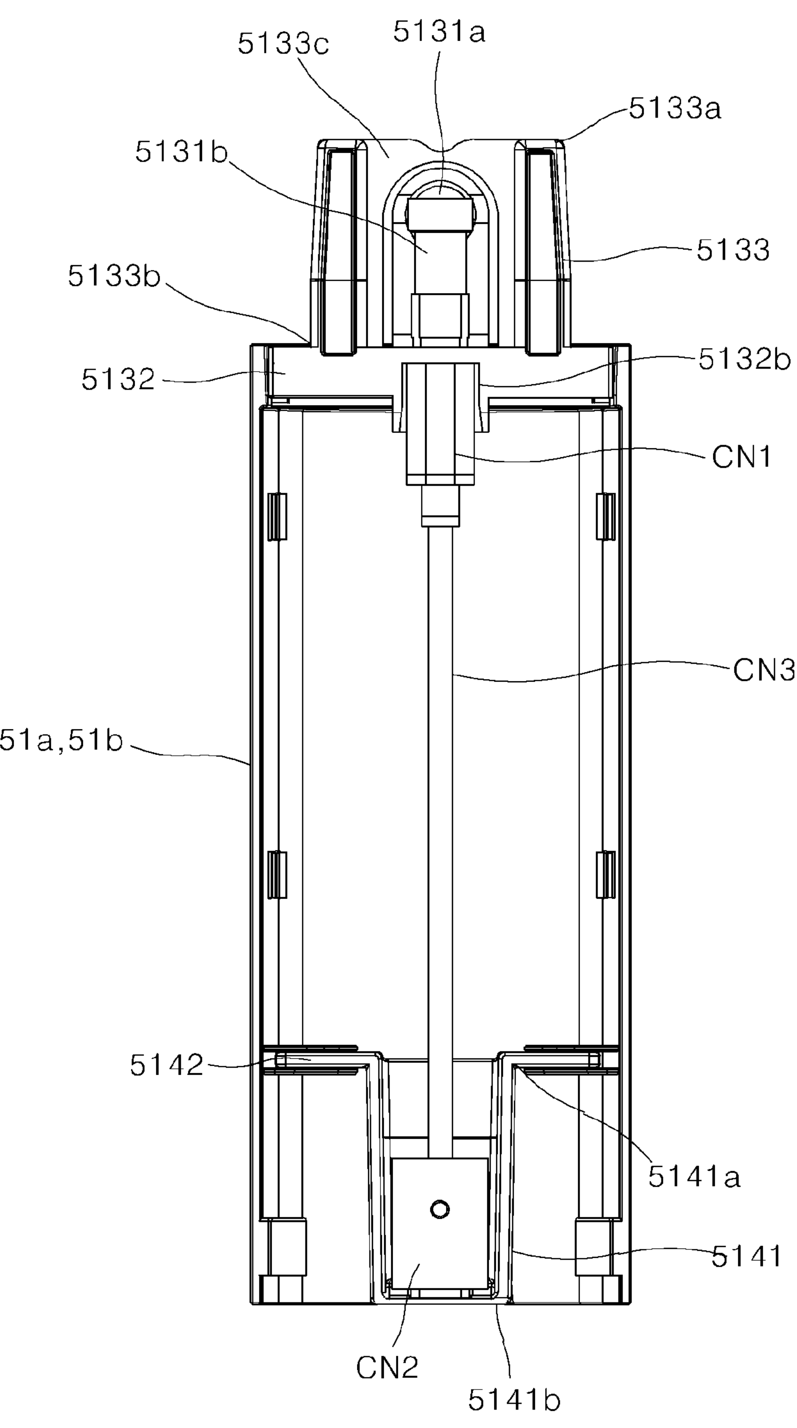
FIG. 10 is a front view of the first spacer.

FIGS. 8 to 10 illustrate the detailed configuration of the first spacer 51 of the pair of spacers 51 and 52. The detailed configuration of the first spacer 51 will be described with reference to FIGS. 8 to 10.

The first spacer 51 has an upper end portion 511 detachably connected to the first end portion 40*d* of the handle part 40 and a lower end portion 512 detachably connected to the main body part 10 and thus serves to support the first end portion 40*d* of the handle part 40 by spaced apart in the upward direction with respect to the main body part 10.

As described above, the first main body insert 124 is provided on the upper left side of the main body part 10, and the lower end portion 512 of the first spacer 51 may be detachably coupled to the first main body insert 124 of the main body part 10.

More specifically, the first spacer 51 may include body parts 51*a* and 51*b* extending linearly in the vertical direction, a first spacer insert 513 fixed to the upper end portions 511 of the body parts 51*a* and 51*b*, and a first spacer fitting part 514 fixed adjacent to the lower end portions 512 of the body parts 51*a* and 51*b*.

The first spacer 51, together with the second spacer 52, which will be described later, serves to change only the vertical position of the handle part 40 without changing the position in the front and rear direction. Accordingly, the body parts 51*a* and 51*b* forming the outer appearance may extend linearly.

In addition, the outer surfaces of the body parts 51*a* and 51*b* which are exposed to the outside when connected to the handle part 40 and the body part 10 may be configured to form a continuous surface with respect to the handle part 40 and the main body part 10 so as to form a sense of unity with the outer surfaces of the handle part 40 and the main body part 10 and may be manufactured by injection molding using the same plastic material as the handle part 40 and the main body part 10.

Meanwhile, in consideration of the moldability of the body parts 51*a* and 51*b* manufactured by injection molding, the body parts 51*a* and 51*b* may be exemplarily configured as a first body part 51*a* and a second body part 51*b* forming divided bodies in the left and right direction, as illustrated.

An internal space may be formed inside the first body part 51*a* and the second body part 51*b* forming the divided body to accommodate the first spacer insert 513 and the first spacer fitting part 514, which will be described later.

A plurality of fastening tabs 51*a*4 and 51*b*3 that protrude toward each other may be integrally provided at the edges of the first body part 51*a* and the second body part 51*b*. The fastening tab 51*a*4 of the first body part 51*a* and the fastening tab 51*b*3 of the second body part 51*b* formed at corresponding positions may be detachably coupled to each other using a hook coupling method.

The first spacer insert 513 coupled to the upper end portion 511 of the body parts 51*a* and 51*b* is inserted into the first end portion 40*d* of the handle part 40 and thus serves to increase coupling strength to the handle part 40.

As described above, when the first spacer insert 513 is not coupled, the first end portion 40*d* of the handle part 40 is detachably coupled to the first main body insert 124 of the main body part 10.

In other words, the first spacer insert 513 of the first spacer 51 and the first main body insert 124 of the main body part 10 may be selectively coupled to the first end portion 40*d* of the handle part 40.

Therefore, so that it can be selectively coupled to the first end portion 40*d* of the handle part 40, the first spacer insert 513 of the first spacer 51 may be a common product with the same shape and specifications as the first body insert 124 of the main body part 10 described above. Here, the meaning that it may be a common product with the same shape and specifications can be interpreted to mean that although it is not physically the same, it can be applied interchangeably within the allowable tolerance range. In this way, the first spacer insert 513 and the first main body insert 124 are shared, which has the effect of reducing design and manufacturing costs for constructing the first spacer 51.

Unless otherwise stated below, the configuration related to the first spacer insert 513 may be equally applied to the first main body insert 124.

The first spacer insert 513 may include an insert base 5132 fixed to the upper end portions 511 of the body parts 51*a* and 51*b*.

The insert base 5132 has an outer appearance that at least corresponds to the internal shape of the upper end portions 511 of the body parts 51*a* and 51*b* and is coupled to the upper end portions 511 of the body parts 51*a* and 51*b* and thus may serve as a stopper that closes the upper end portion 511 of the body parts 51*a* and 51*b*.

Upper support ribs 51*a*1 and 51*b*1 which is disposed to be in close contact with the bottom surface of the insert base 5132 may protrude from the first body part 51*a* and the second body part 51*b*, respectively, so as to support the insert base 5132.

Meanwhile, the upper support rib 51*a*1 of the first body part 51*a* may be integrally provided with an engaging protrusion 51*a*2 that protrudes upward and extends toward the second body part 51*b*.

A first groove part 5132*a* into which an engaging protrusion 51*a*2 is inserted and which has a shape corresponding to the shape of the engaging protrusion 51*a*2 and is open toward the first body part 51*a* may be provided on the lower surface of the insert base 5132.

In this way, since the first groove part 5132*a* of the insert base 5132 is open only toward the first body part 51*a*, when the insert base 5132 is flipped left and right, the first groove part 5132*a* of the insert base 5132 cannot be coupled to the first body part 51*a*. In other words, the first groove part 5132*a* and the engaging protrusion 51*a*2 serve as a means to prevent incorrect assembly of the insert base 5132.

An insert body 5133 that protrudes upward may be integrally provided on the upper surface of the insert base 5132.

As a portion inserted into the first end portion 40*d* of the handle part 40, the insert body 5133 may be formed to have a ㄷ-shaped beam shape so that the insert body 5133 may maintain the weight at a certain level or less but provide connection strength at a certain level or more.

The internal space of the insert body 5133, which is hollow through the ㄷ-shaped beam shape, acts as an insertion space 5133*c* to which the first handle fitting part 43 being adjacent to the first end portion 40*d* of the handle part 40 and provided inside the handle part 40 is coupled.

As illustrated, the width W12 of the insertion space 5133*c* in the front and rear direction can be configured to remain approximately constant while progressing in the vertical direction.

To facilitate entry into the first end portion 40*d* of the handle part 40, the insert body 5133 may be formed so that its horizontal cross-sectional area gradually expands as it progresses from the lower end 5133*b* to the upper end 5133*a*.

Meanwhile, the lower end 5133*b* of the insert body 5133 may be integrated and fixed to the insert base 5132.

Meanwhile, an elastic coupling part 5131 may be provided on one side of the insert body 5133 facing the first body part 51*a*.

For example, the elastic coupling part 5131 may be formed integrally by cutting one side of the insert body 5133 at least partially.

As illustrated, the lower end of the elastic coupling part 5131 becomes a fixed end integrated and coupled with the insert base 5132, and the upper end of the elastic coupling part 5131 may be configured as a free end separated from the insert body 5133.

A coupling protrusion 5131*a* is provided on one upper side of the elastic coupling part 5131, which becomes the free end. For example, the engaging protrusion may be provided in a disk shape, and can be engaged by being inserted into the coupling hole 412 of the handle part 40 described above.

Meanwhile, a protection plate 5131*b* may be provided on the other side of the elastic coupling part 5131 to protect the elastic coupling part 5131 and reinforce the restoring force of the elastic coupling part 5131. For example, the protection plate 5131*b* may be provided in the form of a leaf spring having an ㄴ-shape. The lower end of the leaf spring-shaped protection plate 5131*b* may be fixed to the insert base 5132.

Meanwhile, the first spacer insert 513 may be provided with a first spacer fitting part 514 adjacent to the lower end portion 512 of the body parts 51*a* and 51*b* and fixed to the inside of the body parts 51*a* and 51*b*.

The first spacer fitting part 514 is inserted into the above-described first main body insert 124 and serves to increase the coupling strength to the first main body insert 124.

As described above, the first spacer insert 513 of the first spacer 51 and the first main body insert 124 of the main body part 10 are optionally coupled at the first end portion 40*d* of the handle part 40. Therefore, the first spacer fitting part 514 of the first spacer 51 may be a common product having the same shape and specifications as the first handle fitting part 43 provided at the first end portion 40*d* of the handle part 40. Unless otherwise stated below, the configuration related to the first spacer fitting part 514 may be equally applied to the first handle fitting part 43.

The first spacer fitting part 514 includes a fitting main body 5241 that is directly coupled to the insertion space 5133*c* formed in the first main body insert 124.

Illustratively, the fitting main body 5141 may be configured in a hollow box shape with one side facing the second body part 51*b* and the upper surface open.

Similar to the insert body 5133 of the first spacer insert 513, an inclined surface may be provided on the lower end 5141*a* of the fitting main body 5141 to facilitate insertion into the first main body insert 124.

Meanwhile, so that it can be inserted and coupled to the insertion space formed in the insert body of the first main body insert 124, the width W11 of the lower end of the fitting main body 5241 of the first spacer fitting part 514 in the front and rear direction may be formed to be less than or equal to the width W12 of the insertion space formed in the insert body of the main body insert 124 in the front and rear direction.

A fixing flange 5142 extending in a direction perpendicular to the extension direction of the fitting main body 5141 may be provided at the upper end 5141*b* of the fitting main body 5141.

The fixing flange 5142 is a portion that is in contact with the upper end of the first main body insert 124 when inserted into the first main body insert 124, and acts as a stopper to limit the downward movement of the first spacer fitting part 514.

A pair of lower support ribs **51*a*3 may be provided on the inner surface of the first body part 51*a* for installation and positioning of the fixing flange 5142. The fixing flange 5142** may be fixed in a state where its movement in the vertical direction is restricted while being sandwiched between a pair of lower support ribs.

Meanwhile, a connector part CN for supplying power to the light source part 60 provided in the handle part 40 may be accommodated inside the first spacer.

In other words, the plant cultivator 1 according to an embodiment of the present disclosure is provided with a power supply means for supplying power to the light source part 60 inside the first spacer 51, thereby effectively protecting the power supply means compared to the prior art and improving the aesthetics of the outer appearance of the plant cultivator 1.

In addition, as will be described later, the manufacturing cost can be significantly reduced by constructing the power supply means to be provided only inside the first spacer 51 and not in the second spacer 52.

At this time, the power supply means may be a connector part CN configured to establish or release the power supply state in conjunction with the coupling and separation of the first spacer 51 to the handle part 40 and the main body part 10.

The connector part CN may be configured as a C-type connector known in the art. However, the present disclosure is not limited to this and various types of connector configurations may be applied. As an example, the following description will be made based on the connector part CN having the configuration of a C-type connector.

The connector part CN accommodated inside the first spacer may include a male connector CN1, a female connector CN2, and a power transmission cable CN3 electrically connecting them.

Exemplarily, the male connector CN1 may be fixed to the above-described first spacer insert 513.

More specifically, the male connector may be fixed and supported on the insert base 5132 of the first spacer insert 513.

A second groove part **5132*b* may be formed in the insert base 5132 so that the upper end of the male connector CN1** may pass through and extend at least partially in the vertical direction.

A protective rib **5132*c* extending downward may be provided at the lower portion of the second groove part 5132*b* to surround the male connector CN1 to protect the male connector CN1**.

Additionally, a connector rib **51*b*2 may be integrally provided inside the second body part 51*b* to protect and support the male connector CN1**.

As illustrated, the connector rib **51*b*2 serves as a separation barrier that prevents the male connector CN1** from moving downward.

When the first spacer 51 is coupled to the first end portion **40*d* of the handle part 40, the male connector CN1 fixed to the first spacer insert 513 may be electrically connected to a female connector which is fixed to the first handle fitting part 43. At this time, the female connector provided in the first handle fitting part 43 has a common product relationship with the female connector CN2 provided in the first spacer fitting part 514**, which will be described later.

Meanwhile, the female connector CN2 may be exemplarily provided in the above-described first spacer fitting part 514.

More specifically, it may be fixed and supported on the inner lower end (**5141*a*) of the fitting main body 5141 of the first spacer fitting part 514**.

The lower end **5141*a* of the fitting main body 5141 is at least partially open to allow the male connector CN1 provided in the first main body insert 124 to pass. Like the female connector CN2, the male connector CN1 provided in the first main body insert 124 has a common product relationship with the male connector provided in the first spacer insert 513**.

Figure 11:
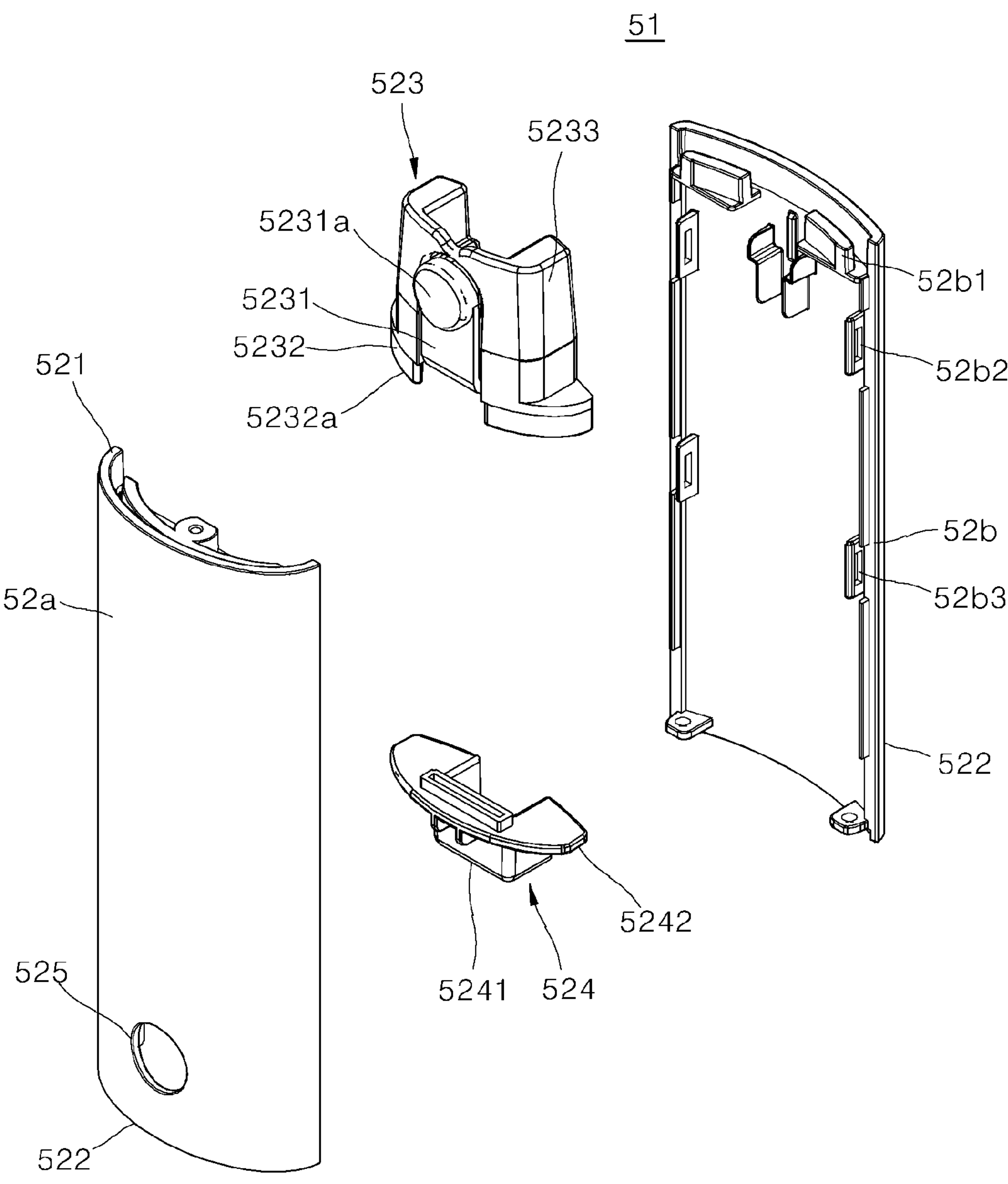
FIGS. 11 and 12 are exploded perspective views of the second spacer of the pair of spacers.
Figure 12:
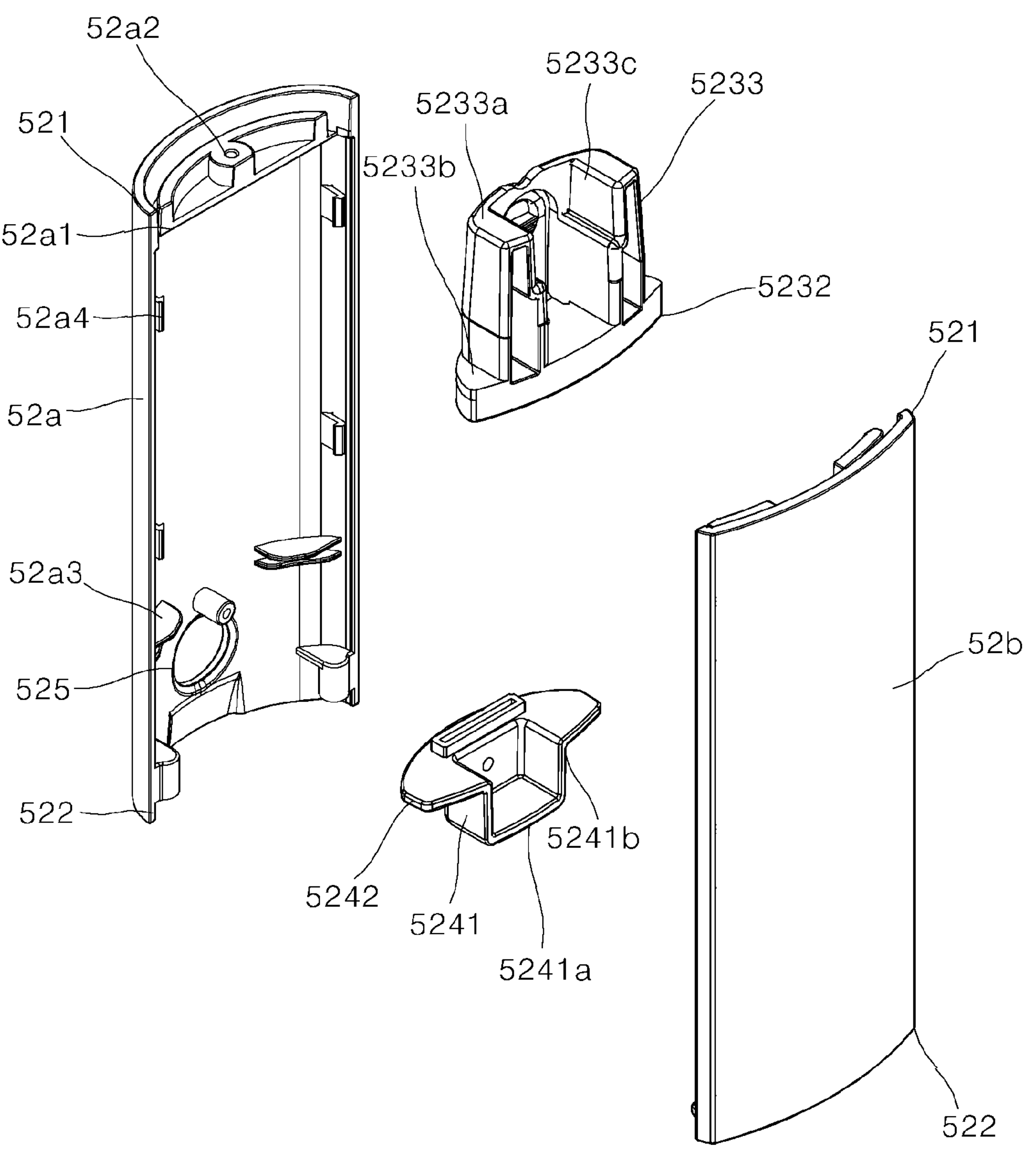
Figure 13:
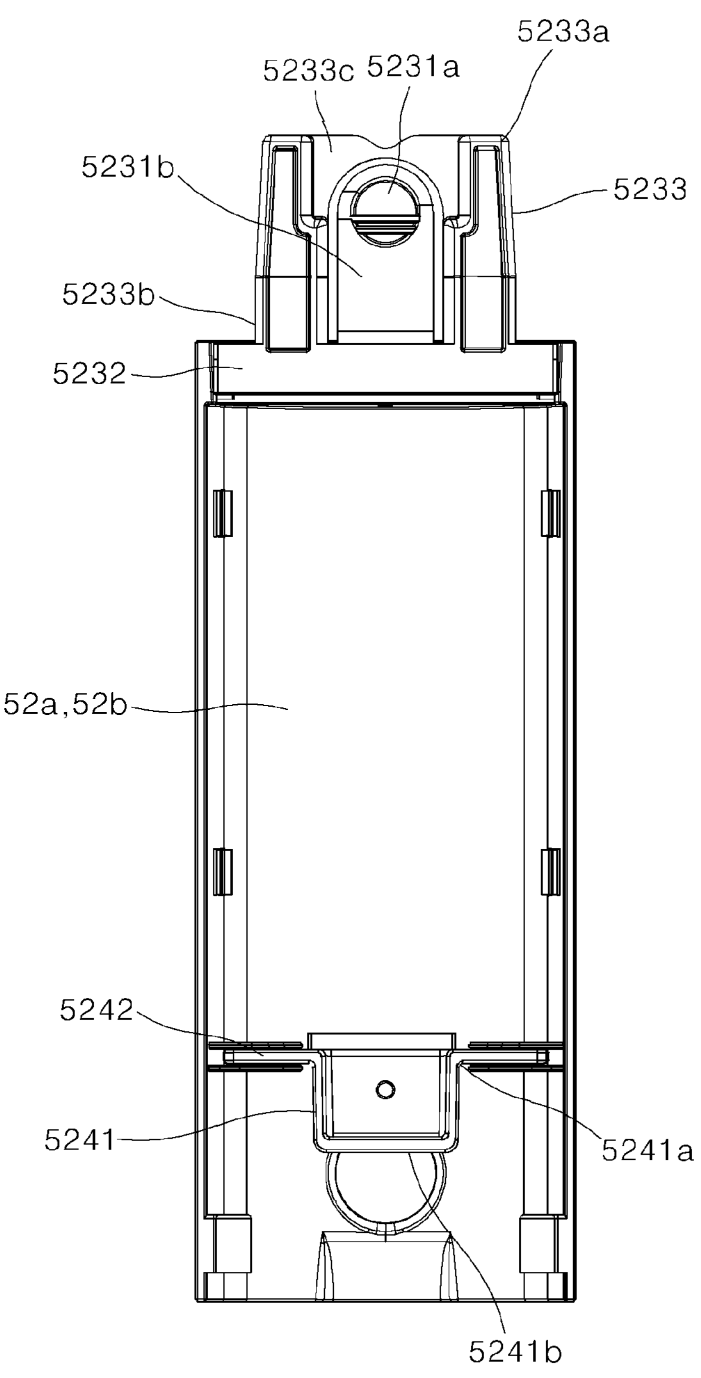
FIG. 13 is a front view of the second spacer.

FIGS. 11 to 13 illustrate the detailed configuration of the second spacer 52 of the pair of spacers 51 and 52. The detailed configuration of the second spacer 52 will be described with reference to FIGS. 11 to 13.

The second spacer 52 has an upper end portion 521 detachably connected to the second end portion **40*e* of the handle part 40 and a lower end portion 522 detachably connected to the main body part 10, and thus serves to support the second end portion 40*e* of the handle part 40 by spaced apart in the upward direction with respect to the main body part 10**.

As described above, the second main body insert 125 is provided on the upper right side of the main body part 10, and the lower end portion 522 of the second spacer 52 may be detachably coupled to the second main body insert 125 of the main body part 10.

More specifically, the second spacer 52 may include body parts **52*a* and 52*b* extending linearly in the vertical direction, a second spacer insert 523 fixed to the upper end portions 521 of the body parts 52*a* and 52*b*, and a second spacer fitting part 524 fixed adjacent to the lower end portions 522 of the body parts 52*a* and 52*b***.

The second spacer 52, together with the above-described first spacer 51, serves to change only the vertical position of the handle part 40 without changing the position in the front and rear direction. Accordingly, the body parts **52*a* and 52*b*** forming the outer appearance may extend linearly.

In addition, the outer surfaces of the body parts **52*a* and 52*b* which are exposed to the outside when connected to the handle part 40 and the main body part 10 may be configured to form a continuous surface with respect to the handle part 40 and the main body part 10 so as to form a sense of unity with the outer surfaces of the handle part 40 and the main body part 10 and may be manufactured by injection molding using the same plastic material as the main body part 10**.

More preferably, the body parts **52*a* and 52*b* of the second spacer 52 may be common products having the same shape and specifications as the body parts 51*a* and 51*b* of the first spacer 51. This has the effect of reducing design and manufacturing costs to configure the body parts 52*a* and 52*b* of the second spacer 52 by sharing the body parts 52*a* and 52*b* of the second spacer 52 and the body parts 51*a* and 51*b* of the first spacer 51. Unless otherwise stated below, the configuration related to the body parts 52*a* and 52*b* of the second spacer 52 may be identical to the configuration of the body parts 51*a* and 51*b* of the first spacer 51**.

In other words, the configuration of the first body part **51*a* of the first spacer 51 may be applied as is to the configuration of the upper support rib 52*a*1, the engaging protrusion 52*a*2, the lower support rib 52*a*3, and the fastening tab 52*a*4 constituting the first body part 52*a* of the second spacer 52**.

Likewise, the configuration of the second body part **51*b* of the first spacer 51 may be applied as is to the configuration of the upper support rib 52*b*1, the connector rib 52*b*2, and the fastening tab 52*b*3 constituting the second body part 52*b* of the second spacer 52**.

Description of overlapping content with respect to the body parts **52*a* and 52*b* of the second spacer 52** will be omitted.

The second spacer insert 523 coupled to the upper end portion 521 of the body parts **52*a* and 52*b* serves to increase the coupling strength to the handle part 40 by being inserted into the inside of the second end portion 40*e* of the handle part 40, similar to the first spacer insert 513** described above.

As described above, in a state where the second spacer insert 523 is not coupled, the second end portion **40*e* of the handle part 40 is detachably coupled to the second main body insert 125 of the main body part 10**.

In other words, the second spacer insert 523 of the second spacer 52 and the second main body insert 125 of the main body part 10 may be selectively coupled to the second end portion **40*e* of the handle part 40**.

Therefore, so that it can be selectively coupled to the second end portion **40*e* of the handle part 40, the second spacer insert 523 of the second spacer 52 may be a common product with the same shape and specifications as the second main body insert 125 of the main body part 10** described above.

Unless otherwise stated below, the configuration related to the second spacer insert 523 may be equally applied to the second main body insert 125.

The second spacer insert 523 may include an insert base 5232 fixed to the upper end portions 521 of the body parts **52*a* and 52*b***.

The insert base 5232 has an external shape that at least corresponds to the internal shape of the upper end portions 521 of the body parts **52*a* and 52*b*, and is coupled to the upper end portions 521 of the body parts 52*a* and 52*b* and thus can serve as a stopper that closes the upper end portion of the body parts 52*a* and 52*b***.

Similar to the first spacer 51, the insert base 5232 of the second spacer insert 523 may support the lower surface by the upper support rib **52*a*1, 52*b*1 which is integrally provided to the first body part 52*a* and the second body part 52*b***.

Likewise, the insert base 5232 of the second spacer insert 523 may be provided with a first groove part **5232*a* into which the engaging protrusion 52*a*2 provided on the upper support rib 52*a*1 of the first body part 52*a*** is inserted.

In addition, similar to the first spacer 51, an insert body 5233 having a ㄷ-shaped beam shape may be integrally provided on the upper surface of the insert base 5232, and the inner space of the insert body 5233 which becomes a hollow state through the ㄷ-shaped beam shape is adjacent to the second end portion **40*e* of the handle part 40 and thus serves as an insertion space 5233*c* where the second handle fitting part 44 provided inside the handle part 40** is coupled.

However, unlike the first spacer 51, the width of the insertion space **5233*c* of the insert body 5233 of the second spacer 52** in the front and rear direction may be configured to form a step.

More specifically, as illustrated, the insertion space **5233*c* of the insert body 5233 has a width on the upper end 5233*a* in the front and rear direction that is larger than the width on the lower end 5233*b*** in the front and rear direction, forming a step.

In other words, the width W22 on the upper end **5233*a* in the front and rear direction corresponds to the width W21 of the fitting main body of the second handle fitting part 44 of the handle part 40 in the front and rear direction, as will be described later, and thus may be formed in a form that is more expanded than the width on the lower end 5233*b*** in the front and rear direction.

The width W22 on the upper end **5233*a* of the insert body 5233 in the front and rear direction, which is configured to be expanded in this way, and the width W21 of the fitting main body of the second handle fitting part 44 in the front and rear direction serves as a means to prevent misassembly/misconnection between the first spacer 51 and the second spacer 52**.

In addition, the configuration of the elastic coupling part 5231, which is provided in the second spacer insert 523 and includes a coupling protrusion **5231*a* and a protection plate 5231*b*, can be applied in the same manner as that of the first spacer insert 513**.

Meanwhile, the second spacer fitting part 524 adjacent to the lower end portion 522 of the body parts **52*a* and 52*b* of the second spacer insert 523 and fixed to the inside of the body parts 52*a* and 52*b* may be provided in a shape similar to the spacer fitting part 514** described above.

Similar to the first spacer fitting part 514, the fitting main body 5241 of the second spacer fitting part 524 may be configured in a hollow box shape with one side facing the second body part **52*b* and the upper surface open, and a fixing flange 5242 extending in a direction perpendicular to the extension direction of the fitting main body 5241 may be provided at the upper end of the fitting main body 5241**.

However, unlike the first spacer fitting part 514, the height of the fitting main body 5241 of the second spacer fitting unit 524 in the vertical direction from the upper end **5241*b* to the lower end 5241*a* may be formed smaller than the height of the fitting main body 5141 of the first spacer fitting part 514**.

In addition, unlike the first spacer fitting part 514, the width W21 of the lower end of the fitting main body 5241 of the second spacer fitting part 524 in the front and rear direction may be formed to be larger than the width W11 at the lower end of the fitting main body 5241 in the front and rear direction.

Here, the width W21 in the front and rear direction and the height in the vertical direction at the lower end of the fitting main body 5241 of the second spacer fitting part 524 have dimensions corresponding to the width W22 in the front and rear direction and the height in the vertical direction at the upper end **5233*a* of the insertion space 5233*c* of the insert body 5233** described above.

Meanwhile, as described above, the plant cultivator 1 according to an embodiment of the present disclosure is configured to include a connector part CN corresponding to a power supply means for supplying power to the light source part 60 only in the first spacer 51 and not in the second spacer 52.

Therefore, the male connector CN1, female connector CN2, and power transmission cable CN3 constituting the connector part CN are not disposed inside the body parts **52*a*, 52*b* of the second spacer 52, and means for supporting or fixing these are not provided in the second spacer insert 523 and the second spacer fitting part 524**.

Since only the first spacer 51 is provided with a connector for supplying power to the light source part 60, when the first spacer 51 and the second spacer 52 are coupled in a reversed state, the light source part 60 becomes a state where power cannot be supplied.

As described above, in the plant cultivator 1 according to an embodiment of the present disclosure, the means for preventing such misassembly/misconnection may be implemented through complementary shapes of the second spacer insert 523 and the second main body insert 125 that enable or disable the coupling of the first spacer fitting part 514 and the first handle fitting part 44.

Figure 14:
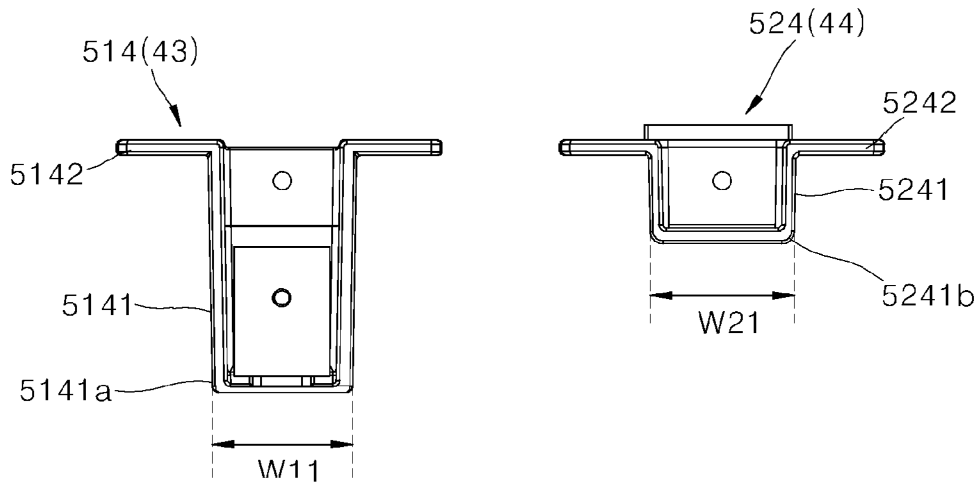
FIG. 14 is an exploded perspective view for explaining a means for preventing misassembly/misconnection of the first spacer and the second spacer.
Figure 14:
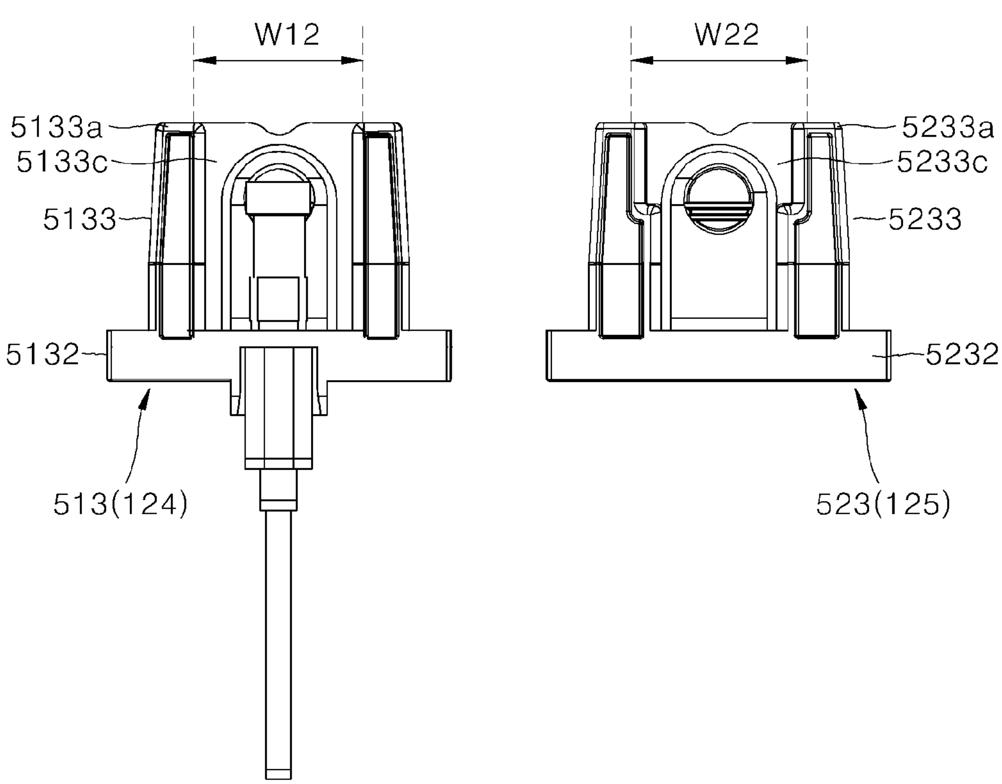

As illustrated in FIG. 14, the width W21 of the lower end of the fitting main body 5241 of the second spacer fitting part 524 and the fitting main body of the second handle fitting part 44 in the front and rear direction is formed to be larger than the width W11 of the lower end of the fitting main body 5141 of the first spacer fitting part 514 and the fitting main body of the second handle fitting part 43 in the front and rear direction.

At this time, the width W22 on the upper end of the second spacer insert 523 and the second main body insert 125 in the front and rear direction may be formed to be larger than or equal to the width W21 on the lower end of the fitting main body 5241 of the second spacer fitting part 524 and the fitting main body of the second handle fitting part 44 in the front and rear direction so that the lower end of the fitting main body 5241 of the second spacer fitting part 524 and the fitting main body of the second handle fitting part 44 may be inserted.

However, as illustrated, the width W12 on the upper end of the first spacer insert 513 and the first main body insert 124 in the front and rear direction is formed to be smaller than the width W21 on the lower end of the fitting main body 5241 of the second spacer fitting part 524 and the fitting main body of the second handle fitting part in the front and rear direction.

Therefore, a relationship may be established in which the lower end of the fitting main body 5241 of the second spacer fitting part 524 and the fitting main body of the second handle fitting part 44 cannot be inserted and coupled to the upper end of the first spacer insert 513 and the first main body insert 124.

In other words, a relationship may be established in which at least the lower end portion 522 of the second spacer 52 cannot be coupled to the first main body insert 124, and a relationship may be established in which the upper end portion 511 of the first spacer 51 cannot be coupled to the second end portion 40*e* of the handle part 40.

Through this, misassembly/misconnection of the first spacer 51 and the second spacer 51 can be effectively prevented, and furthermore, even when the handle part 40 is directly coupled to the main body part 10, misassembly/misconnection may be effectively prevented.

As described above, it is obvious that the present disclosure has been described with reference to the illustrative drawings, but the present disclosure is not limited to the embodiments and drawings disclosed herein, and various modifications may be made by those skilled in the art within the scope of the technical idea of the present disclosure. In addition, although the operational effects according to the configuration of the present disclosure were not explicitly described and explained while explaining the embodiments of the present disclosure above, it is natural that the predictable effects due to the configuration should also be recognized.

The invention claimed is:

1. A plant cultivator comprising:

a main body on which a cultivation package with a growing medium is seated;

a light assembly configured to emit light toward the cultivation package;

a housing disposed above the main body and configured to accommodate the light assembly; and a spacer configured to connect the main body and the housing, wherein the spacer includes:

a first spacer having an upper end portion which is coupled to a first end portion of the housing and a lower end portion which is coupled to the main body; and a second spacer having an upper end portion which is coupled to a second end portion of the housing and a lower end portion which is coupled to the main body; and wherein the housing includes an extension part disposed between the first end portion of the housing and the second end portion of the housing, wherein the light assembly is provided on a lower part of the extension part, wherein the upper end portion of the first spacer is configured to prevent the first spacer from being coupled with the second end portion of the housing, wherein a first insert body protruding upward and having a first insertion space therein is provided on the upper end portion of the first spacer, wherein a second insert body protruding upward and having a second insertion space therein is provided on the upper end portion of the second spacer, wherein a first fitting main body is provided inside the housing and at the first end portion of the housing, the first fitting main body protruding downward and being configured to be inserted into the first insertion space when the first spacer is coupled to the housing, wherein a second fitting main body is provided inside the housing and at the second end portion of the housing, the second fitting main body protruding downward and being configured to be inserted into the second insertion space when the second spacer is coupled the housing, and wherein a width of a lower end of the second fitting main body in a front and rear direction is greater than a width of an upper end of the first insertion space in the front and rear direction.

2. The plant cultivator of claim 1, wherein the light assembly receives power from the main body through the spacer.

3. The plant cultivator of claim 2, wherein the connector part is positioned to be spaced apart from the second spacer.

4. The plant cultivator of claim 2, wherein the connector part includes:

a first connector disposed at one of the upper end portion or the lower end portion of the first spacer;

a second connector disposed at another one of the upper end portion or the lower end portion of the first spacer; and a wire configured to electrically connect the first connector and the second connector.

5. The plant cultivator of claim 4, wherein the first spacer includes:

a first spacer body which is hollow and has a first end portion and a second end portion, each of the first end portion and the second end portion of the first spacer body being open;

a first spacer insert disposed at the first end portion of the first spacer body and configured to close the first end portion of the first spacer body; and a first spacer fitting disposed at the second end portion of the first spacer body and configured to close the second end portion of the first spacer body;

wherein the first connector is coupled to the first spacer insert, wherein the second connector is coupled to the first spacer fitting, and wherein the wire is disposed inside the first spacer body.

6. The plant cultivator of claim 5, wherein a first fitting is provided at the first end portion of the housing, and the first fitting is configured to be coupled to the first spacer insert when the first spacer is coupled to the housing, and wherein a third connector is disposed in the first fitting, and the third connector is configured to be electrically connected to the first connector of the first spacer when the first fitting is coupled to the first spacer insert.

7. The plant cultivator of claim 6, wherein the main body includes a first main body insert, and the first main body insert is configured to be coupled to the first spacer fitting when the first spacer is coupled to the main body, and wherein a fourth connector is disposed on the first main body insert, and the fourth connector is configured to be electrically connected to the second connector of the first spacer when the first main body insert is coupled to the first spacer fitting.

8. The plant cultivator of claim 7, wherein the fourth connector provided in the first main body insert is configured to be electrically connected to a third connector provided in the first fitting of the housing when the housing and the main body are coupled together without the spacer.

9. The plant cultivator of claim 7, wherein the first connector and the fourth connector are male connectors, and the second connector and third connectors are female connectors.

10. The plant cultivator of claim 4, wherein the first connector is a male connector, and the second connector is a female connector.

11. The plant cultivator of claim 1, wherein the spacer includes a connector part configured to transmit the power from the main body to the light assembly and disposed on the first spacer.

12. The plant cultivator of claim 1, wherein a width of a lower end of the first fitting main body in the front and rear direction is less than a width of an upper end of the second insertion space in the front and rear direction.

13. The plant cultivator of claim 12, wherein the width of the upper end of the second insertion space in the front and rear direction is greater than a width of the lower end thereof in the front and rear direction.

14. The plant cultivator of claim 1, wherein the light assembly includes:

a circuit board received in the extension part; and a plurality of light source elements provided on the circuit board, and wherein the housing includes at least one of a transparent cover or one or more holes through which light from the light source elements is emitted toward the cultivation package.

15. The plant cultivator of claim 1, wherein the housing defines a handle configured to be touched by a user to move the plant cultivator.

* * * * *